US010783336B2

(12) United States Patent
Cardinal

(10) Patent No.: US 10,783,336 B2
(45) Date of Patent: Sep. 22, 2020

(54) RESHAPE-ABLE OLED DEVICE FOR POSITIONING PAYMENT INSTRUMENT

(71) Applicant: Bank of America Corporation, Charlotte, NC (US)

(72) Inventor: Donald J. Cardinal, San Antonio, TX (US)

(73) Assignee: Bank of America Corporation, Charlotte, NC (US)

( * ) Notice: Subject to any disclaimer, the term of this patent is extended or adjusted under 35 U.S.C. 154(b) by 148 days.

(21) Appl. No.: 16/021,464

(22) Filed: Jun. 28, 2018

(65) Prior Publication Data

US 2020/0005000 A1    Jan. 2, 2020

Related U.S. Application Data

(63) Continuation-in-part of application No. 15/957,040, filed on Apr. 19, 2018, now Pat. No. 10,331,990, (Continued)

(51) Int. Cl.
*G06K 7/10* (2006.01)
*G06K 9/00* (2006.01)
(Continued)

(52) U.S. Cl.
CPC ......... *G06K 7/10297* (2013.01); *G06K 7/087* (2013.01); *G06K 9/00201* (2013.01); *G06K 9/629* (2013.01); *G06Q 20/4018* (2013.01); *H01L 27/3227* (2013.01); *H01L 51/5253* (2013.01); *H01L 27/3244* (2013.01);
(Continued)

(58) Field of Classification Search
USPC ........................................................ 235/492
See application file for complete search history.

(56) References Cited

U.S. PATENT DOCUMENTS 2,912,066 A    11/1959  Ellithorpe
3,703,864 A    11/1972  Bradford
(Continued)

FOREIGN PATENT DOCUMENTS

| DE | 102009028991 | 8/2009 |
| EP | 0827066 | 7/1997 |
| WO | WO2013131153 | 4/2012 |

OTHER PUBLICATIONS

Conor Gaffey, "World's Smallest Nano Chip will Double Processing Power of Smartphones," Jun. 9, 2015.
(Continued)

*Primary Examiner* — Allyson N Trail
(74) *Attorney, Agent, or Firm* — Weiss & Arons LLP; Michael A. Springs, Esq.

(57) ABSTRACT

Aspects of the disclosure relate to organic light emitting diode (OLED) devices reshape-able to position an article in a predetermined space. The article may be a card. When reshaped, the OLED device may form the predetermined space. The OLED device may include at least one verification sensor positioned relative to the predetermined space. The OLED device may use one or more verification sensors to detect the article that is positioned in the predetermined space. The OLED device may use one or more verification sensors to collect information associated with the article that is in the predetermined space.

17 Claims, 16 Drawing Sheets

Related U.S. Application Data which is a continuation of application No. 15/497,030, filed on Apr. 25, 2017, now Pat. No. 9,978,010, which is a continuation of application No. 15/187,931, filed on Jun. 21, 2016, now Pat. No. 9,665,818.

(51) Int. Cl.
| | | |
|---|---|---|
| *G06K 9/62* | (2006.01) | |
| *G06Q 20/40* | (2012.01) | |
| *H01L 27/32* | (2006.01) | |
| *G06K 7/08* | (2006.01) | |
| *H01L 51/52* | (2006.01) | |
| *H01L 51/56* | (2006.01) | |

(52) U.S. Cl.
CPC ...... *H01L 51/56* (2013.01); *H01L 2251/5338* (2013.01); *H01L 2251/558* (2013.01)

(56) References Cited

U.S. PATENT DOCUMENTS

| | | | |
|---|---|---|---|
| 3,946,206 | A | 3/1976 | Darjany |
| 4,372,225 | A | 2/1983 | Tissot et al. |
| 4,557,352 | A | 12/1985 | Tschappat, Jr. |
| 4,953,326 | A | 9/1990 | Wexler et al. |
| 4,968,873 | A | 11/1990 | Dethloff et al. |
| 5,168,354 | A | 12/1992 | Martinez et al. |
| 5,313,051 | A | 5/1994 | Brigida et al. |
| 5,539,819 | A | 7/1996 | Sonoyama et al. |
| 5,693,956 | A | 12/1997 | Shi et al. |
| 5,734,154 | A | 3/1998 | Jachimowicz et al. |
| 5,770,849 | A | 6/1998 | Novis et al. |
| 5,970,888 | A | 10/1999 | Sheppard |
| 6,015,092 | A | 1/2000 | Postlewaite et al. |
| 6,057,646 | A | 5/2000 | Pieroth et al. |
| 6,173,899 | B1 | 1/2001 | Rozin |
| 6,394,343 | B1 | 5/2002 | Berg et al. |
| 6,724,103 | B2 | 4/2004 | Parrault |
| 7,025,277 | B2 | 4/2006 | Forrest et al. |
| 7,270,276 | B2 | 9/2007 | Vayssiere |
| 7,357,315 | B2 | 4/2008 | Vergara et al. |
| 7,360,682 | B2 | 4/2008 | Shane et al. |
| 7,360,691 | B2 | 4/2008 | Takayama |
| 7,461,774 | B2 | 12/2008 | Vergara et al. |
| 7,523,856 | B2 | 4/2009 | Block et al. |
| 7,588,183 | B2 | 9/2009 | Shane et al. |
| 7,791,559 | B2 | 9/2010 | Piasecki |
| 7,814,016 | B2 | 10/2010 | Pranger |
| 7,856,116 | B2 | 12/2010 | Rodriguez et al. |
| 7,940,159 | B2 | 5/2011 | Clemens et al. |
| 7,992,789 | B2 | 8/2011 | Borracci |
| 8,237,068 | B2 | 8/2012 | Szaikowski |
| 8,276,823 | B2 | 10/2012 | Chen |
| 8,282,007 | B1 | 10/2012 | Cloutier et al. |
| 8,317,094 | B2 | 11/2012 | Lehman |
| 8,378,932 | B2 | 2/2013 | Fein et al. |
| 8,392,965 | B2 | 3/2013 | Carter et al. |
| 8,413,893 | B2 | 4/2013 | Kim |
| 8,471,782 | B2 | 6/2013 | Muklashy et al. |
| 8,479,981 | B2 | 7/2013 | Carmichael et al. |
| 8,399,889 | B2 | 9/2013 | Wu et al. |
| 8,523,059 | B1 | 9/2013 | Mullen et al. |
| 8,540,151 | B1 | 9/2013 | Snyder et al. |
| 8,678,293 | B2 | 3/2014 | Chen |
| 8,756,680 | B2 | 6/2014 | Shashidhar |
| 8,810,816 | B2 | 8/2014 | Fischer et al. |
| 8,820,638 | B1 | 9/2014 | Cotter et al. |
| 9,250,657 | B2 | 2/2016 | Kim et al. |
| 9,470,404 | B2 | 10/2016 | Lee et al. |
| 9,491,879 | B2 | 11/2016 | Cheng et al. |
| 9,538,127 | B2 | 1/2017 | Gish |
| 9,577,216 | B2 | 2/2017 | Fujino et al. |
| 10,056,048 | B2 | 8/2018 | Kim |
| 2001/0007332 | A1 | 7/2001 | Kjonaas et al. |
| 2003/0145205 | A1 | 7/2003 | Sarcanin |
| 2003/0208405 | A1 | 11/2003 | Putman et al. |
| 2005/0064936 | A1 | 3/2005 | Pryor |
| 2005/0102499 | A1 | 5/2005 | Kosuga et al. |
| 2005/0134461 | A1 | 6/2005 | Gelbman et al. |
| 2005/0173518 | A1 | 8/2005 | Takayama |
| 2005/0263590 | A1 | 12/2005 | Branck et al. |
| 2006/0016884 | A1 | 1/2006 | Block et al. |
| 2006/0091223 | A1 | 5/2006 | Zellner et al. |
| 2006/0131393 | A1 | 6/2006 | Cok et al. |
| 2006/0261174 | A1 | 11/2006 | Zellner et al. |
| 2006/0289629 | A1 | 12/2006 | Smith et al. |
| 2007/0115202 | A1 | 5/2007 | Kiesenhofer |
| 2007/0215695 | A1* | 9/2007 | Trane ............... G06Q 20/206 235/380 |
| 2007/0273507 | A1 | 11/2007 | Burchell et al. |
| 2007/0279315 | A1 | 12/2007 | Laves et al. |
| 2008/0035736 | A1 | 2/2008 | Tompkin et al. |
| 2008/0105751 | A1 | 5/2008 | Landau |
| 2008/0158150 | A1 | 7/2008 | Rossman et al. |
| 2009/0039154 | A1 | 2/2009 | Williams et al. |
| 2009/0278452 | A1 | 11/2009 | Kim |
| 2009/0298546 | A1 | 12/2009 | Kim et al. |
| 2009/0314840 | A1 | 12/2009 | Granucci et al. |
| 2010/0084476 | A1 | 4/2010 | Zellner et al. |
| 2010/0260388 | A1 | 10/2010 | Garrett et al. |
| 2010/0302206 | A1 | 12/2010 | Yu et al. |
| 2011/0058113 | A1 | 3/2011 | Threlkel et al. |
| 2011/0060640 | A1 | 3/2011 | Thompson et al. |
| 2011/0140841 | A1 | 6/2011 | Bona et al. |
| 2011/0148944 | A1 | 6/2011 | Kobayashi |
| 2011/0164047 | A1 | 7/2011 | Pance |
| 2011/0178928 | A1 | 7/2011 | Carmichael et al. |
| 2011/0186194 | A1* | 8/2011 | Gallo ............... A45C 1/06 150/132 |
| 2011/0241996 | A1 | 10/2011 | Vesely |
| 2012/0019434 | A1 | 1/2012 | Kuhlman et al. |
| 2012/0136733 | A1* | 5/2012 | Mason ............... G06Q 20/20 705/16 |
| 2012/0194985 | A1* | 8/2012 | Renteria Villagomez ................... G06Q 30/04 361/679.02 |
| 2012/0268762 | A1 | 10/2012 | Fischer et al. |
| 2012/0274727 | A1 | 11/2012 | Robinson et al. |
| 2012/0280924 | A1 | 11/2012 | Kummer et al. |
| 2013/0162594 | A1 | 6/2013 | Paulsen et al. |
| 2013/0221112 | A1 | 8/2013 | Lai et al. |
| 2013/0232082 | A1 | 9/2013 | Krawczewicz et al. |
| 2013/0341394 | A1 | 12/2013 | Seo et al. |
| 2014/0007002 | A1 | 1/2014 | Chang et al. |
| 2014/0081729 | A1 | 3/2014 | Ocher |
| 2014/0093144 | A1 | 4/2014 | Feekes |
| 2014/0114861 | A1 | 4/2014 | Mages et al. |
| 2014/0118415 | A1 | 5/2014 | Seo |
| 2014/0172700 | A1 | 6/2014 | Teuwen et al. |
| 2014/0197385 | A1* | 7/2014 | Madigan ............... H01L 51/56 257/40 |
| 2014/0226275 | A1 | 8/2014 | Ko et al. |
| 2014/0267960 | A1 | 9/2014 | Ward |
| 2014/0291406 | A1 | 10/2014 | Ko |
| 2014/0337957 | A1 | 11/2014 | Feekes |
| 2014/0339315 | A1 | 11/2014 | Ko |
| 2014/0353384 | A1 | 12/2014 | Hoegerl et al. |
| 2014/0374494 | A1 | 12/2014 | Seo |
| 2015/0069126 | A1 | 3/2015 | Leon |
| 2015/0077646 | A1 | 3/2015 | Chen et al. |
| 2015/0179025 | A1 | 6/2015 | Cowell |
| 2015/0262052 | A1 | 9/2015 | Pahuja |
| 2015/0262154 | A1* | 9/2015 | Wolfson ............... G06Q 20/145 705/13 |
| 2016/0004945 | A1 | 1/2016 | Wade |
| 2016/0027391 | A1 | 1/2016 | Gibson et al. |
| 2016/0054479 | A1 | 2/2016 | Ho et al. |
| 2016/0085325 | A1 | 3/2016 | Lee et al. |
| 2016/0098700 | A1 | 4/2016 | Johnson et al. |
| 2016/0098709 | A1 | 4/2016 | Johnson et al. |
| 2016/0171461 | A1 | 6/2016 | Hoover et al. |
| 2016/0210453 | A1 | 7/2016 | Seo et al. |
| 2016/0219046 | A1 | 7/2016 | Ballard et al. |
| 2016/0224528 | A1 | 8/2016 | Trevarthen et al. |

(56) References Cited

U.S. PATENT DOCUMENTS

| | | | |
|---|---|---|---|
| 2016/0254336 A1 | 9/2016 | Zhang et al. | |
| 2016/0307089 A1 | 10/2016 | Wurmfeld et al. | |
| 2017/0103718 A1 | 4/2017 | Miller | |
| 2017/0357979 A1 | 12/2017 | Khurana et al. | |
| 2019/0147708 A1* | 5/2019 | Monaco | G06Q 20/322 705/16 |
| 2019/0274202 A1* | 9/2019 | Boivin | F21V 33/0004 |
| 2020/0026482 A1* | 1/2020 | Kendall | H04N 13/239 |

OTHER PUBLICATIONS http://www.us.schott.com/innovation/ultrathinglass/, Retrieved on Sep. 14, 2016.
"Schott's Reliable and Strong Ultra-Thin Glass Features in Fingerprint Sensors in new Smartphones," Retrieved on Sep. 14, 2016.
Ron Martens, "The OLED Handbook, A Guide to OLED Technology, Industry & Market," 2015 Edition.
Bryce Kellogg, Vamsi Talla, Shyamnath Gollakota and Joshua R. Smith, "Passive Wi-Fi; Bringing Low Power to Wi-Fi Transmissions," Retrieved on May 11, 2016.
Ron Mertens, SecureCard—A New Secure Credit Card Technology, Utilizing an OLED Display, Nov. 21, 2006, Metalgrass Software.
John Wehr, "Card Size Specifications: When Does Card Size Matter?" Jan. 1, 2002.
Zachary Shahan, "Ultra-Thin-Solar-Cell Company Unstealths, Aims to Cut Cost of Solar Cells in Half!" Mar. 14, 2012, Sustainable Enterprises Media, Inc.
"ISO Magnetic Stripe Card Standards," Retrieved on Jul. 18, 2016.
"Coin Vs. Plastic: Which Credit Card Consolidation Tool is the Best?" Retrieved on Apr. 7, 2016, PayProTec.
"Tiny Batteries Could Revolutionize Green Energy," Retrieved on Apr. 5, 2016, National Geographic Society.
"Yubikey 4 & Yubikey 4 Nano," Retrieved on Apr. 7, 2016, Yubico.
"Magnetic Stripe Card Standards," Retrieved on Apr. 20, 2016, MagTek Inc., Seal Beach, California.
"A Power-Harvesting Pad-Less mm-sized 24/60GHz Passive Radio With On-Chip Antennas," Retrieved on Apr. 19, 2016, IEEE.
"Magnetic Stripe Card Recommendations," Retrieved on Apr. 20, 2016.
"Plastic Card Manufacturing Including Magnetic Stripe Tapelaying," Retrieved on Apr. 20, 2016.
Paul Buckley, "Flexible OLED Displays Target Volume Production in 2015," Feb. 5, 2015.
"MAX2837—2.3GHz to 2.7GHz Wireless Broadband RF Transceiver," Retrieved on May 30, 2016, Maxim Integrated.
"Ultrathin Rechargeable Lithium Polymer Batteries from PowerStream," Apr. 5, 2016, Lund Instrument Engineering, Inc.
Tom Abate, "Stanford Engineers Aim to Connect the World with Ant-Sized Radios," Sep. 9, 2014, Stanford University, Stanford California.
http://www.schott.com/advanced_optics/english/syn/advanced_optics/products/wafers-and-thin-glass/glass-wafer-and-substrates/ultra-thin-glass/index.html, Retrieved on May 30, 2016.
Jennifer Langston, "UW Engineers Achieve Wi-Fi at 10,000 Times Lower Power," Feb. 23, 2016.
Ron Mertens, "New All-In-One Credit Card Concept," Oct. 29, 2009, Metalgrass Software.
"Wi-Fi," Apr. 12, 2016, Wikimedia Foundation, Inc.
"Ant-Sized IoT Radio," Retrieved on Jul. 18, 2016.
Nick Pino, "Samsung's Latest OLED Can be a Mirror, a Window, or a TV," Jun. 11, 2015, Future US, Inc., San Francisco, California.
"Pneumatic Tube," Mar. 11, 2016, Wikimedia Foundation, Inc.
"New Virtual Tellers," Retrieved on Jun. 6, 2016, Frontier Bank.
Dario Borghino, "High-Tech Light Shutter Could Help Turn Your Windows into LCD Displays," May 1, 2015, Gizmag.
L. Zhao et al. "Novel Method for Fabricating Flexible Active Matrix Organic Light Emitting Diode (AMOLED) Displays," Sep. 21, 2011, Hewlett-Packard Development Company, L.P.
Amar Toor, "LG Unveils Flexible Plastic E-paper Display, Aims for European Launch Next Month," Mar. 29, 2012.
Martyn Williams, "Samsung, LG Show Flexible OLED, E-Paper Screens," Nov. 10, 2010.
"Electronic Paper," Jun. 10, 2016, Wikimedia Foundation, Inc.
"E Ink," Jun. 8, 2016, Wikimedia Foundation, Inc.
"Ink Technology: Electrophoretic Ink, Explained," Retrieved on Jun. 20, 2016, E Ink Holdings, Inc.
"Are Toeprints Unique, Like Fingerprints?" Retrieved on Jun. 23, 2016.
Sampath Srinivas, Dirk Balfanz, Eric Tiffany, Alexi Czeskis, "Univeral $2^{nd}$ Factor (U2F) Overview", May 14, 2016, FIDO Alliance.
"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Surni Das, "A Keyboard that Rises Up From Flat Touch Screens," Feb. 13, 2013.
Jessica Leber, "A Shape-Shifting Smartphone Touch Screen," Dec. 3, 2012.
Matthew Frankel, "Could This Be the Bank of the Future?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc., Palo Alto, California.

* cited by examiner

RESHAPE-ABLE OLED DEVICE FOR POSITIONING PAYMENT INSTRUMENT

CROSS-REFERENCE TO RELATED APPLICATIONS

This application is a continuation-in-part of U.S. patent application Ser. No. 15/957,040, filed on Apr. 19, 2018, entitled "ORGANIC LIGHT EMITTING DIODE ("OLED") UNIVERSAL PLASTIC", which is a continuation of U.S. patent application Ser. No. 15/497,030, filed on Apr. 25, 2017, entitled "ORGANIC LIGHT EMITTING DIODE ("OLED") UNIVERSAL PLASTIC", now U.S. Pat. No. 9,978,010, which is a continuation of U.S. patent application Ser. No. 15/187,931, filed on Jun. 21, 2016, entitled "ORGANIC LIGHT EMITTING DIODE ("OLED") UNIVERSAL PLASTIC", now U.S. Pat. No. 9,665,818, all of which are hereby incorporated by reference herein in their respective entireties.

FIELD OF TECHNOLOGY

Aspects of the disclosure relate to a reshape-able organic light emitting diode (OLED) device. Specifically, aspects of the disclosure relate to reshape-able OLED devices for positioning articles.

BACKGROUND OF THE DISCLOSURE

Many exchanges of information ("exchanges") are executed remotely, absent face-to-face interaction. An exchange may include a transaction. An exchange may include settlement of a financial obligation. An exchange may include verification of various documents.

A remote exchange may involve a first party transmitting information to a second party. The information may be associated with an article. For example, the exchange may be a transaction. In the transaction, the first party may wish to transmit credit card information to the second party. In a second example, the exchange may involve verification of a document. In the second example, the first party may wish to transmit verification of photo identification to the second party.

In a remote exchange, a first party may wish to authenticate a payment instrument or other article (hereinafter, an "article") that plays a role in the exchange. For example, the first party may wish to authenticate a credit card. In another example, the first party may wish to authenticate a driver's license.

Typically, authenticating an article in a remote transaction involves providing information associated with the article. The information may be an alphanumeric code written on or associated with the article. Examples of a code may include a credit card account number, a card verification value (CVV) code, an expiration date, a name, and a driver's license number.

Typical methods for authenticating an article are vulnerable to misuse. A malicious party may gain access to information associated with an article. The malicious party may perform a fraudulent exchange with a second party. The malicious party may falsely authenticate the fraudulent exchange by providing the information. The second party may be deceived into believing that the malicious party is in possession of the article.

Typical methods for authenticating an article are also susceptible to user error. A user may easily provide inaccurate information by mistake. Inaccurate information may cause an exchange to be delayed. Inaccurate information may cause an exchange to be cancelled. Inaccurate information may even lead to a user being locked out from using the article for other exchanges.

It would be desirable to leverage organic light emitting diode (OLED) technology to provide an OLED device for authenticating an article. It would be desirable for the OLED device to verify the existence and presence of the article. It would be further desirable for the OLED device to collect and transmit information associated with the article.

SUMMARY OF THE DISCLOSURE

Aspects of the disclosure relate to an organic light emitting diode (OLED) device reshape-able to position a payment instrument. The OLED device may include a screen. The screen may include an array of OLEDs. The array of OLEDs may form at least one pixel. The OLED device may include a power source. The OLED device may include a processor circuit. The processor circuit may include a non-transitory memory and a processor. The OLED device may include one or more verification sensors.

The screen in the OLED device may be configured to be reshape-able. The OLED device may define at least one axis along which the screen reshapes. When reshaped, the screen may define a predetermined space in at least one dimension. The space may be for positioning a payment instrument.

The OLED device may detect the payment instrument in the predetermined space. The detection may be responsive to a request from the processor circuit. The detection may be via at least one of the verification sensors.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
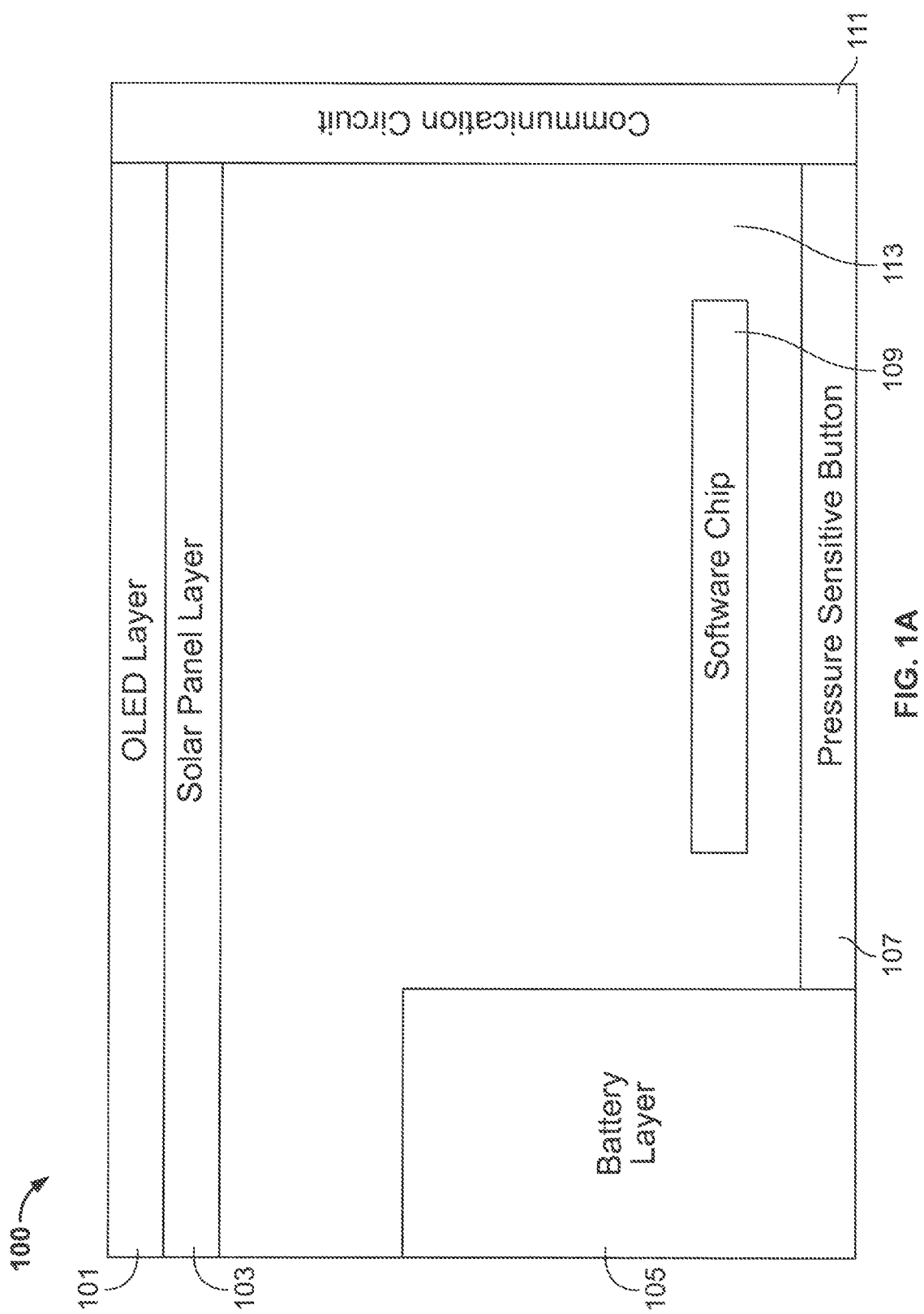
FIG. 1A shows illustrative apparatus in accordance with principles of the disclosure.

Aspects of the disclosure relate to an organic light emitting diode (OLED) device. The OLED device may utilize OLED technology to enhance security and usability of a payment instrument. A payment instrument may include a credit card, debit card and/or other forms of payment. Such other forms of payment may include an instrument or device that includes a contactless chip, such as an ISO14443-compliant contactless chip, a smart phone, a tablet, a transponder or any other suitable electronic purchasing devices. Payment instruments may store sensitive data in a magnetic strip, a bar code, a silicon chip, nonvolatile computer readable media or any other suitable data storage device or format.

Suitable payment instruments may also conform to specifications published by the International Organization for Standardization. Illustrative specifications may include: ISO/IEC 7810, ISO/IEC 7811 and ISO/IEC 7816, which are hereby incorporated herein by reference in their respective entireties.

OLEDs include solid-state semiconductors constructed from a thin film of organic material. OLEDs emit light when electricity is applied across the thin film of organic material. Because OLEDs are constructed using organic materials, OLEDs may be safely disposed without excessive harm to the environment.

OLEDs may be used to construct a display that consumes less power compared to other display technologies. For example, in a Liquid Crystal Display (hereinafter, "LCD"), power must be supplied to the entire backlight to illuminate just one pixel in the display. In contrast, an OLED display does not require a backlight. Furthermore, in an OLED display, preferably, only the illuminated pixel draws power.

OLEDs may also be used to construct a display that is flexible. OLED displays may be folded, bent, creased, flexed, rolled and/or otherwise reshaped. An exemplary OLED device as described herein may be flexible in its entirety. Alternatively, an exemplary OLED device may only be flexible in part. For example, the screen of the OLED device may be flexible, while a module that houses other components of the device may be rigid. In certain embodiments, a screen may be stowed in a folded, bent, rolled and/or otherwise reshaped state when not in use.

OLED technology may be leveraged to provide an OLED device with unique and innovative features. The flexibility and high level of customizability of OLED technology presents a possibility for designing OLED devices for enhancing security and usability of a payment instrument. The OLED device may be designed to provide features for the confirming the presence and capturing details of a payment instrument.

An OLED device may be any suitable size and/or shape. An OLED device may include any suitable functionality. For example, the OLED device may include the size, shape, and/or functionality of a standard credit card. The OLED device may include the size, shape, and/or functionality of a standard check. The OLED device may include the size, shape, and/or functionality of any suitable mobile phone or tablet. The OLED device may include the size, shape, and/or functionality of a notebook, laptop, or desktop computer. The OLED device may have any other suitable size, shape, and/or functionality.

The OLED device may include a programmable array of OLEDs. The OLEDs may form a display. The display may be a screen. The OLED display may be visible on a front face, back face and/or thickness of the OLED device. The OLED display may cover some or all of a surface area of the OLED device. For example, the surface area of a surface of the OLED device may be 138.4 mm×67.3 mm. The OLED display may cover 10%, 30%, 50%, 75%, 90%, 100% or any suitable percentage of the of the surface area.

The OLED device may include a touch sensor. A touch sensor may alternatively be referred to herein as a tactile sensor. The touch sensor may be positioned above or below the OLED display. In some embodiments, the touch sensor may include a capacitive sensor. In other embodiments, the touch sensor may include a resistive sensor. In still other embodiments, the touch sensor may include a gravimetric sensor. A touch sensor may also include a pressure sensor.

The OLED device may include a communication circuit. The communication circuit may have a thickness that allows it to be contained within a device that is 7.3 mm thick. The device may be a mobile phone.

The OLED device may include a processor circuit. The processor circuit may alternatively be referred to herein as a software chip. The processor circuit may have a thickness that allows it to be contained within a device that is 7.3 mm thick. The processor circuit may include a processor. The processor may control the overall operation of the OLED device and its associated components. The processor circuit may include RAM, ROM, an input/output ("I/O") module and a non-transitory or non-volatile memory.

The I/O module may include a microphone, button and/or touch screen which may accept user provided input. The I/O module may include one or more of a speaker for providing audio output and a display for providing textual, audiovisual and/or graphical output. The display may include one or more OLEDs.

Software may be stored within the non-transitory memory and/or other storage media. The software may provide instructions to the processor for enabling the OLED device to perform various functions. For example, the non-transitory memory may store software used by the OLED device, such as an operating system, application programs, web browser and a database. Alternatively, some or all of computer executable instructions of the OLED device may be embodied in hardware or firmware components of the OLED device.

Application programs, which may be used by the OLED device, may include computer executable instructions for invoking user functionality related to communication, such as email, short message service ("SMS"), and voice input and speech recognition applications. Application programs may utilize one or more algorithms that securely store sensitive data, process received executable instructions, perform power management routines or other suitable tasks.

The OLED device may include a pressure sensitive button. The pressure sensitive button may be actuated by a user to activate the OLED device. For example, actuating the pressure sensitive button may activate the processor or communication circuits.

In some embodiments, the OLED device may be activated in response to receiving high frequency wireless signals. The high frequency signals may provide power to one or more components (e.g., the communication circuit) of the OLED device. In response to receiving the power, the processor circuit may be activated and begin to draw power from a battery or other power source on the OLED device.

The OLED device may operate in a networked environment. The OLED device may support a connection to a cellular communication network. The OLED device may support establishing network connections to one or more remote computers. Such remote computers may be nodes on a network. The nodes may be mobile phones, personal computers or servers that include many or all of the elements described above relative to the OLED device. The nodes may be associated with a party that is conducting an exchange with a party associated with the OLED device.

The network connections may include a local area network ("LAN") and a wide area network ("WAN"), and may also include other networks. When used in a LAN networking environment, the OLED device may be connected to the LAN through a network interface or adapter. The communication circuit may include the network interface or adapter. The network connections may also include any suitable wireless communication networks. Examples of wireless communication networks include third generation (3G), fourth generation (4G), and fifth generation (5G) wireless networks.

When used in a WAN networking environment, the OLED device may include a modem or other suitable components for establishing communications over a WAN, such as the Internet. The communication circuit may include the modem or other suitable components.

It will be appreciated that the network connections shown are illustrative and other means of establishing a communications link between devices may be used. The existence of any of various well-known protocols such as TCP/IP, Ethernet, FTP, HTTP and the like is presumed, and the OLED device can be operated in a client-server configuration to permit a user to retrieve web pages from a web-based server. Web browsers can be used to display and manipulate data on web pages.

The OLED device and network nodes may include various other components, such as a battery, a speaker, and antennas (not shown). For example, the OLED device and/or network nodes may be portable devices such as a laptop, a tablet, a smartphone or any other suitable device for receiving, storing, transmitting and/or displaying relevant information.

The OLED device may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The OLED device may utilize computer-executable instructions, such as program modules, being executed by a computer. Generally, program modules include routines, programs, objects, components, data structures, etc. that perform particular tasks or implement particular abstract data types. The OLED device may be operational with distributed computing environments where tasks are performed by remote processing devices that are linked through a communications network. In a distributed computing environment, program modules may be located in both local and remote computer storage media including memory storage devices.

The OLED device may include a power source. The power source may provide power to other components of the OLED device. For example, the power source may power the OLED display, the communication circuit and the processor circuit. Illustrative power sources may include a battery. The battery may be rechargeable.

The power source may be a renewable power source. The power source may be flexible. The power source may include one or more batteries.

The power may include electromagnetic waves. For example, the OLED device's power source may include high frequency signals received from a node on a wireless network. The payment instrument may be configured to utilize received high frequency signals to recharge a battery or provide power to other components of the OLED device.

The power source of the payment instrument may include a solar panel. The power source of the payment instrument may include a thermoelectric generator. The thermoelectric generator may utilize body heat to generate electricity.

The power source may have any suitable thickness. For example, the power source may be designed to be contained within a device that is 7.3 mm thick.

An OLED device reshape-able to position a payment instrument for providing a level of authentication is provided. The OLED device may include a screen. The screen may include an array of OLEDs. The array of OLEDs may form at least one pixel. The OLED device may include a power source. The power source may illuminate the screen. The OLED device may include a processor circuit. The processor circuit may include a non-transitory memory and a processor. The OLED device may include one or more verification sensors. The verification sensors may be disposed in specific positions relative to the predetermined space.

The screen in the OLED device may be configured to be reshape-able. The OLED device may define at least one axis along which the screen reshapes. When reshaped, the screen may define a predetermined space in at least one dimension. The space may be for, or aid in, positioning a payment instrument.

The OLED device may detect the payment instrument in the predetermined space. The OLED device may detect the presence of the payment instrument in the predetermined space. The detection may be responsive to a request from the processor circuit. The detection may be obtained via at least one of the verification sensors.

In one embodiment of the OLED device, at least one verification sensor may include an OLED as a light sensor. An OLED as a light sensor may use an OLED as a photodiode to detect light. The OLED may be able to alternatively emit light and detect light. The OLED as a light sensor may include an OLED from the array of OLEDs. The OLED may include a matrix of OLEDs that includes dimensions of a standardized card. The processor may toggle the OLED between a display mode and a sensing mode. The OLED as a light sensor, when toggled to a sensing mode, may detect physical characteristics of a payment instrument in the predetermined space. The physical characteristics may include the information printed on a surface of the payment instrument.

In certain embodiments, the OLED device may define a front surface and a back surface. One or both of the front and back surface may include a screen. The OLED device may include a first verification sensor embedded in a section of the front surface. The OLED device may also include a second verification sensor embedded in a section of the back surface. The OLED device may be configured to be rolled such that the section of the front surface overlaps and faces the section of the back surface. The interstitial space between the facing, overlapped, sections may form the predetermined space. In this embodiment, the first verification sensor may detect one side of the payment instrument in the predetermined space. The second verification sensor may detect another side of the payment instrument in the predetermined space.

In certain embodiments, the OLED device may include at least one hinge. The hinge may connect at least two parts of the screen. The connection may be at an axis. The hinge may enable reshaping the screen. In such an embodiment, the screen may preferably traverse the hinge.

In certain embodiments of the OLED device, the screen may include a flexible material. The flexible material may enable the screen to reshape.

The OLED device may further include a linear indicator formed thereon. The linear indicator may be for indicating the location of an axis. In certain embodiments, the linear indicator may be a line displayed on the screen. The OLED device may display a linear indicator in a position that, when the screen is reshaped along the linear indicator to form a predetermined space, the verification sensors are in suitable positions to detect an article in the predetermined space.

In certain embodiments of the OLED device, the screen may be configured to reshape to form a maximum angle that is in the range between 10 and 180 degrees. The maximum angle may be measured as the angular difference between the screen in a planar state and the screen in a reshaped state. The angle may be measured about an axis. The screen may reshape about the axis. Reshaping the screen may form a crease in the screen along the axis.

In other embodiments, reshaping the screen may form a rounded bend without a crease. A rounded bend may be referred to herein as a rounded axis. A rounded axis may refer to a rounded bend that forms around a line about which the screen is bent. The line may be referred to as an axis. The maximum angle may be measured about a projected axis that represents a simulated crease. The measurement may be similar to using a protractor, or a similar angular measurement tool. The maximum angle may be determined as though two ends of the reshaped screen are positioned along a perimeter of the protractor.

In other embodiments of the OLED device, the screen may be configured to reshape to form a maximum angle of substantially 180 degrees. Substantially 180 degrees may be within 10 degrees of 180 degrees. Substantially 180 degrees may be any number of degrees sufficient to fold the screen about an article. Folding the screen about an article may include "sandwiching" the article between two parts of the screen. A screen configured to reshape to form a maximum angle of substantially 180 degrees may enable the screen to fold onto itself. The screen may fold about at least a part of an article.

In one embodiment, the OLED device may include a first verification sensor at a first location. The first verification sensor may be embedded at the first location. The OLED device may also include a second verification sensor at a second location. The second verification sensor may be embedded at the second location. The first and second locations may be separated by an axis. In this embodiment, the predetermined space for a payment instrument may be formed by folding the screen about at least part of the payment instrument. Folding the screen about at least part of the payment instrument may include reshaping the screen to a maximum angle of substantially 180 degrees, such that a part of the screen faces at least a part of a first side of the payment instrument, and another part of the screen faces at least a part of a second side of the payment instrument. When a payment instrument is positioned in the predetermined space, the first verification sensor may detect a first side of the payment instrument, and the second verification sensor may detect a second side of the payment instrument.

In some embodiments, at least one verification sensor may be disposed in a specific position relative to the predetermined space. For example, a camera may be installed in the OLED device in a position to capture the account number of a credit card that is positioned in the predetermined space. In another example, a touch sensor may be embedded in the screen in a specific location relative to the predetermined space. The specific location may enable the touch sensor to measure a size and weight of an article in the predetermined space.

In some embodiments, the OLED device includes a single verification sensor that detects one side of an article. In other embodiments, a plurality of verification sensors may be used to detect one side of the article. In still other embodiments, a plurality of sides of the article are each detected by at least one sensor. The plurality of sides may include a top surface, a bottom surface, and edge surfaces.

In certain embodiments, the OLED device includes a first axis and a second axis. In this embodiment, the screen may be reshaped along the first axis and also reshaped along the second axis. When reshaped along the first and second axes, the screen may define a predetermined space that is bound by the first and second axes. The predetermined space may be for positioning a payment instrument In certain embodiments, the payment instrument may be a credit card. In other embodiments, the payment instrument may be a debit card. The credit card and the debit card may be smart cards.

In some embodiments, the payment instrument may be a mobile phone or a tablet. In some embodiments, the OLED device may also be a mobile phone or a tablet. In some embodiments, a mobile phone that is a payment instrument may be positioned on or within a mobile phone that is the OLED device for authentication. In other embodiments, two mobile phones may authenticate each other in a two-way handshake. The two-way handshake may be accomplished by each mobile phone detecting the other within each respective mobile phone's predetermined space.

In certain embodiments, the predetermined space may define at least one dimension of the three-dimensional geometry of a standardized card. The dimensions of a standardized card may be as defined by ISO/IEC 7810# ID-1 as 3⅜ in×2⅛ in×1/32 in.

In certain embodiments, at least one of the verification sensors may be a camera or a tactile sensor. The camera or tactile sensor may be embedded within the array of OLEDs. The tactile sensor may detect the physical presence of an article. The tactile sensor may measure a size and/or weight of an article. In some embodiments, the OLED device may include both a camera and a tactile sensor.

Verification sensors may include infrared sensors. Verification sensors may include OLEDs as light sensors. An OLED as a light sensor may include OLEDs that function as photodiodes. The OLEDs may also function to illuminate the screen.

Verification sensors may include proximity sensors or occupancy sensors. Proximity or occupancy sensors may detect the physical presence of an article in a predetermined space. Proximity or occupancy sensors may also detect a distance between the sensor and the article. Proximity or occupancy sensors may include laser, microwave, ultrasonic, radar, and/or sonar technologies. The proximity or occupancy sensors may detect an article by comparing an emitted wave with a received return wave. Analysis of the pattern of the return wave may suggest information about the size, shape, density and material makeup of the article. The analysis may include the Doppler effect.

Proximity or occupancy sensors may include two sensors positioned opposite one another in the predetermined space. In this embodiment, a first sensor may transmit a wave to a second, opposing, sensor. The sensors may detect an article by comparing the wave transmitted by the first sensor to the wave received by the second sensor.

In certain embodiments, at least one of the verification sensors extracts information from the payment instrument. The information may be contained in a magnetic strip or a chip embedded in the payment instrument. The information may include an account number associated with the payment instrument. The information may be used as part of a transaction. In other embodiments, information such as an account number may be entered manually into an I/O component of the OLED device.

In certain embodiments, the OLED device includes at least one notch. The notch may be for securing the payment instrument in the predetermined space. The notch may be a feature formed in and/or on the screen. The feature may be a linear feature. The feature may be a hooked feature. The feature may be any suitably shaped or formed feature for securing an article in a predetermined space. The notch may secure the article from shifting out of a desired position in the predetermined space.

In some embodiments, the OLED device may include one notch for engaging an article at one side and securing the article. In other embodiments, the OLED device may include a plurality of notches for engaging an article at one or more sides. A plurality of notches may engage one side of an article. A plurality of notches may engage two opposing sides of an article. A plurality of notches may engage two adjacent sides of an article. A plurality of notches may engage at least 3, or all, the sides of an article.

In some embodiments, the notch may be absent in a default state. The OLED device may be configured to form tangible notches on an otherwise smooth surface of the screen in response to a command from the processor. For example, the OLED device may include a fluid-filled plastic panel and associated reservoir. Because OLED displays may be transparent, information may be viewed through the fluid-filled panel. The fluid-filled panel may include channels. The fluid-filled panel and associated reservoir may be used to produce the tangible notch on the surface of the screen. In another example, the tangible notches may be actuated via an actuator.

In some embodiments, the notch may be formed on a part of the OLED device that is not the screen. The notch may be formed proximal to the screen such that an article is secured in a position with a part of the article extending over the screen. The notch may include a lip that surrounds at least a part of the screen.

In some embodiments, the notch may secure a first edge of the payment instrument. The screen may be reshaped by being bent around a second edge of the payment instrument. The second edge may be opposite the secured first edge of the payment instrument. The reshaping may form an axis where the screen bends around the second edge. In this embodiment, a first verification sensor may capture a picture of the payment instrument. A second verification sensor may measure at least one dimension of the payment instrument by detecting the distance between the notch and the axis. For example, a measured width of $2\frac{1}{8}$ inches may verify the presence a payment card compliant with ISO standards.

An organic light emitting diode (OLED) device reshape-able to define a predetermined space for positioning an article is provided. A reshape-able OLED device may be flexible and/or bendable. Positioning the article in the predetermined space may enable the OLED device to provide a level of authentication. The OLED device may include a screen. The screen may include an array of OLEDs. The array of OLEDs may form at least one pixel. The OLED device may include a power source. The power source may illuminate the screen. The OLED device may include a processor circuit. The processor circuit may include a non-transitory memory and a processor. The OLED device may include one or more verification sensors.

The screen of the OLED device may be configured to be reshape-able. The screen may define an axis along which the screen reshapes. When reshaped, the screen may define a predetermined space in at least one dimension. The space may be for positioning an article.

Responsive to a request from the processor circuit, the OLED device may collect information associated with the article via at least one of the verification sensors. Collecting information may include capturing various attributes. The article may be positioned in the predetermined space.

In certain embodiments of the OLED device, the article may be a payment instrument. The payment instrument may be a credit, debit, cash, smart card, and/or a mobile device such as a mobile phone. In other embodiments, the article may be a photo identification card. The photo identification card may be a driver's license. The photo identification card may be a passport. The article may be any identification document. The article may be any suitable article that a party may wish to authenticate in a remote exchange.

In certain embodiments, the information collected by the OLED device may include a photo on a photo identification card. The information collected may include a number associated with the article. The information collected may include a physical attribute of the article. The physical attribute may include size, shape, and/or color of the article.

In certain embodiments of the OLED device, the processor may compare, for verification, the information captured by the OLED device to information stored in the non-transitory memory. The information stored in memory may include identifying information about an article. Identifying information may include account numbers, names, dates, and security codes. Identifying information may include physical characteristics such as size, shape, material, color, and design. The OLED device may include, or have access to, a database containing such identifying information about a plurality of articles.

In certain embodiments, the article may be a card with symbols embossed thereon. The article may be a credit card. The symbols may be a name, expiration date, and/or account number on a credit card. When the article is pressed against the screen in the predetermined space, a tactile sensor that is a verification sensor may capture the embossed symbols.

In certain embodiments of the OLED device, at least one verification sensor may detect the presence of the article in the predetermined space. This may be in addition to collecting information associated with the article. This may provide multiple levels of authentication of the article.

A method for positioning an article in a predetermined space for authentication is provided. The method may include bending a bendable organic light emitting diode (OLED). The bendable OLED device may include an array of OLEDs. The array of OLEDs may form at least one pixel. The bendable OLED device may include a power source. The power source may illuminate the screen. The power source may power a processor circuit. The bendable OLED device may include a processor circuit. The processor circuit may include a non-transitory memory and a processor. The bendable OLED device may include one or more verification sensors.

The method may include positioning the article within a predetermined space. The predetermined space may be formed by bending the bendable OLED device.

The method may include detecting the article in the predetermined space. The method may include detecting the physical presence of the article in the predetermined space. The method may include detecting information associated with the article in the predetermined space. The detecting may be accomplished via at least one of the verification sensors.

In certain embodiments of the method, the bendable OLED device may further include a first verification sensor embedded in a first face of the bendable OLED device. A second verification sensor may be embedded in a second face of the bendable OLED device. The first face of the bendable OLED device may be opposite the second face of the bendable OLED device.

The method may include rolling the bendable OLED device such that a first and second longitudinally opposed ends or sections of the bendable OLED device overlap. The interstice between the overlapped ends may form the predetermined space. The first verification sensor may be facing the second verification sensor in the predetermined space.

The method may include detecting, via the first verification sensor, one side of the article in the predetermined space. The method may also include detecting, via the second verification sensor, another side of the article in the predetermined space.

In some embodiments, the detection of an article or payment instrument in the predetermined space by the OLED device may be used to verify a transaction. For example, an OLED device associated with a first party in a transaction may transmit a message to a second party in a transaction. The message may confirm the presence of the article. The OLED device may also transmit information collected about the article to the second party. The information may have been manually input or collected via verification sensors. Thus, multiple levels of authentication may be provided.

In certain embodiments, the OLED device may transmit a periodic or substantially continuous broadcast authenticating an article. The broadcast may continue so long as the article is detected in the predefined space. The broadcast may be a heartbeat signal verifying the physical presence of the article. The broadcast may be a heartbeat signal verifying a status of the article.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1A shows an illustrative side view of OLED device 100. OLED device 100 includes OLED layer 101. OLED layer 101 may form a reshape-able, bendable, and/or roll-able, thin OLED display with relatively lower power consumption than other display technology.

OLED device 100 may include a touch sensor (not shown). A touch sensor may be alternatively referred to herein as a tactile sensor. The touch sensor may be not greater than 0.001 mm thick. In some embodiments, the touch sensor may be embedded within OLED layer 101. Integrating the touch sensor into the OLED layer 101 may reduce reflectivity due to any space between the touch sensor and OLED layer 101. Reducing reflectivity may increase visibility of information presented using OLED layer 101.

Using OLED layer 101 to display information may have several technical advantages. OLED displays may provide lower power consumption, wider viewing angles, better colors, higher contrast, operate in a wider temperature ranges and enable faster refresh rates than other display technology. In some embodiments, OLED displays may be fabricated directly on control circuitry. OLED displays may only include trace amounts of heavy metals. Thus, when disposed of, OLED display may be less harmful to the environment than other display technology.

OLED device 100 includes solar panel layer 103. OLED displays may be transparent when not illuminated. Thus, when OLED layer 101 is not illuminated, OLED layer 101 may be transparent. Sunlight may pass through OLED layer 101 and reach solar panel layer 103. Solar panel layer 103 may convert solar energy into electricity that powers one or more components of OLED device 100. Solar panel layer 103 may be thin enough to be flexible.

OLED device 100 includes battery 105. Battery 105 may be rechargeable. Battery 105 may be flexible. Battery 105 may be recharged by power generated by solar panel layer 103. Battery 105 may be rechargeable from a power source external to OLED device 100.

OLED device 100 includes software chip 109. Software chip 109 may control overall operation of OLED device 100 and its associated components. Software chip 109 may include the processor circuit. Software chip 109 may include a non-transitory memory. OLED device 100 may include non-transitory memory locations (not shown) within thickness 113. Software chip 109 may access such memory locations. The non-transitory memory locations may store instructions, that when executed by software chip 109, cause OLED device 100 to perform various functions.

For example, memory locations may store software used by OLED device 100, such as an operating system, application programs and an associated database.

OLED device 100 includes communication chip 111. Communication chip 111 may be a communication circuit. Communication chip 111 may provide OLED device 100 with wireless communication functionality. Communication chip 111 may enable OLED device 100 to communicate using a variety of communication protocols including, Wi-Fi, Bluetooth, Ethernet, NFC and cellular telecommunications.

OLED device 100 also includes pressure sensitive button 107. Pressure sensitive button 107 may be mechanically actuated. Actuation of pressure sensitive button 107 may provide an electronic signal to software chip 109 or any other component of OLED device 100.

For example, mechanical actuation of pressure sensitive button 107 may power-on and/or power-off software chip 109. Mechanical actuation of pressure sensitive button 107 may inform software chip 109 of a user's selection of choices displayed using OLED layer 101.

FIG. 1A shows illustrative components 101-113 of OLED device 100 in an arrangement within a thickness of OLED device 100. The arrangement shown in FIG. 1A is illustrative. OLED device 100 may include additional components not shown in FIG. 1A, such as a biometric sensor. One or more of components 101-113, and any additional components, may be arranged within OLED device 100 in any suitable fashion. For example, pressure sensitive button may be located in space 113. OLED layer 101 and/or solar panel layer 103 may flex or bend to allow a user to mechanically actuate pressure sensitive button 107.

Some embodiments may not include all of components 101-113. For example, an OLED device may not include solar panel layer 103 or pressure sensitive button 107.

Figure 1B:
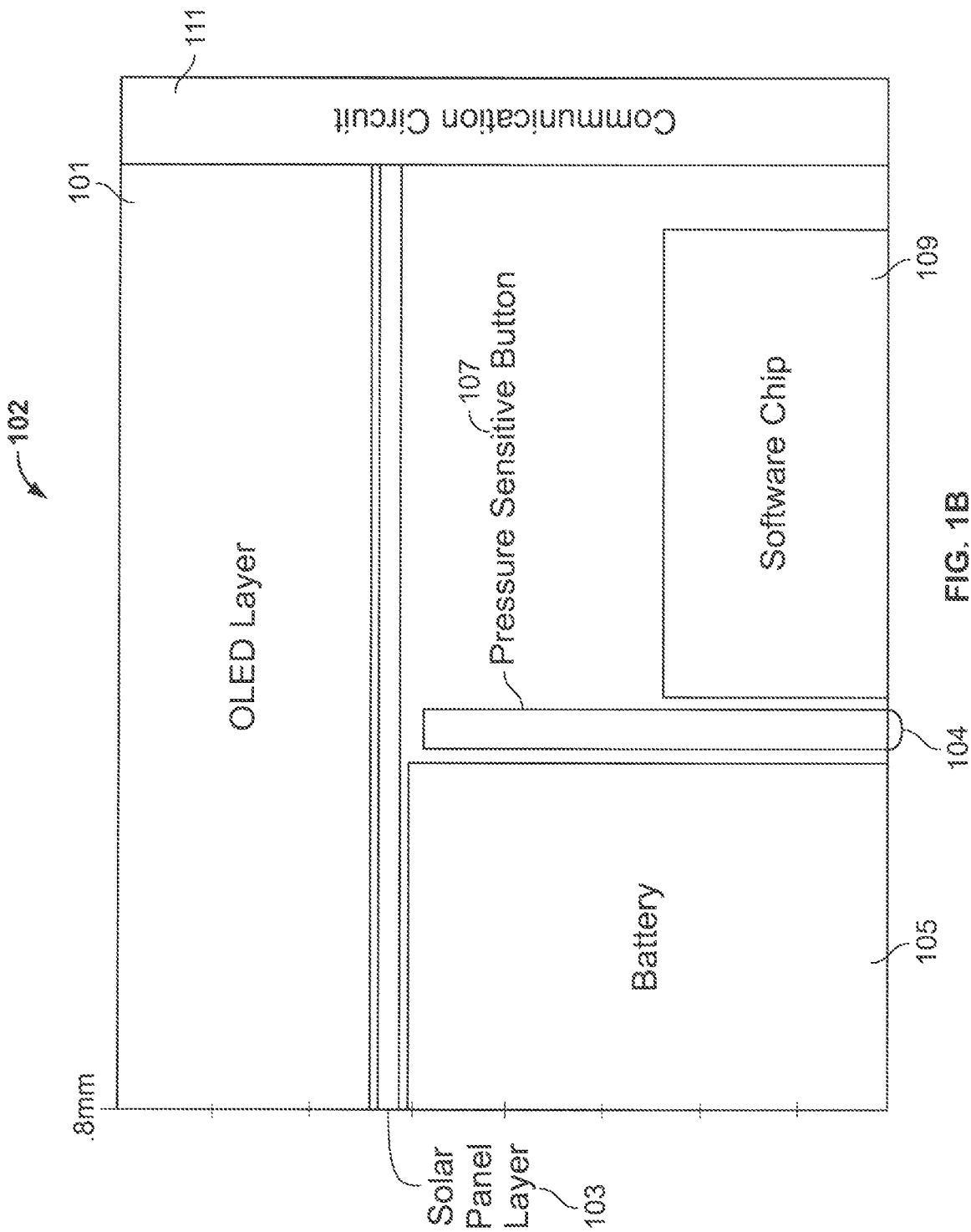
FIG. 1B shows another illustrative apparatus in accordance with principles of the disclosure.

FIG. 1B shows illustrative view 102 of an OLED device. View 102 shows illustrative thicknesses of components 101-111. View 102 shows that in some embodiments, pressure sensitive button 107 may include a portion 104 that protrudes from a surface of an OLED device. In some embodiments, pressure sensitive button 107 may include a portion 104 that dips below a surface of the OLED device.

Figure 2:
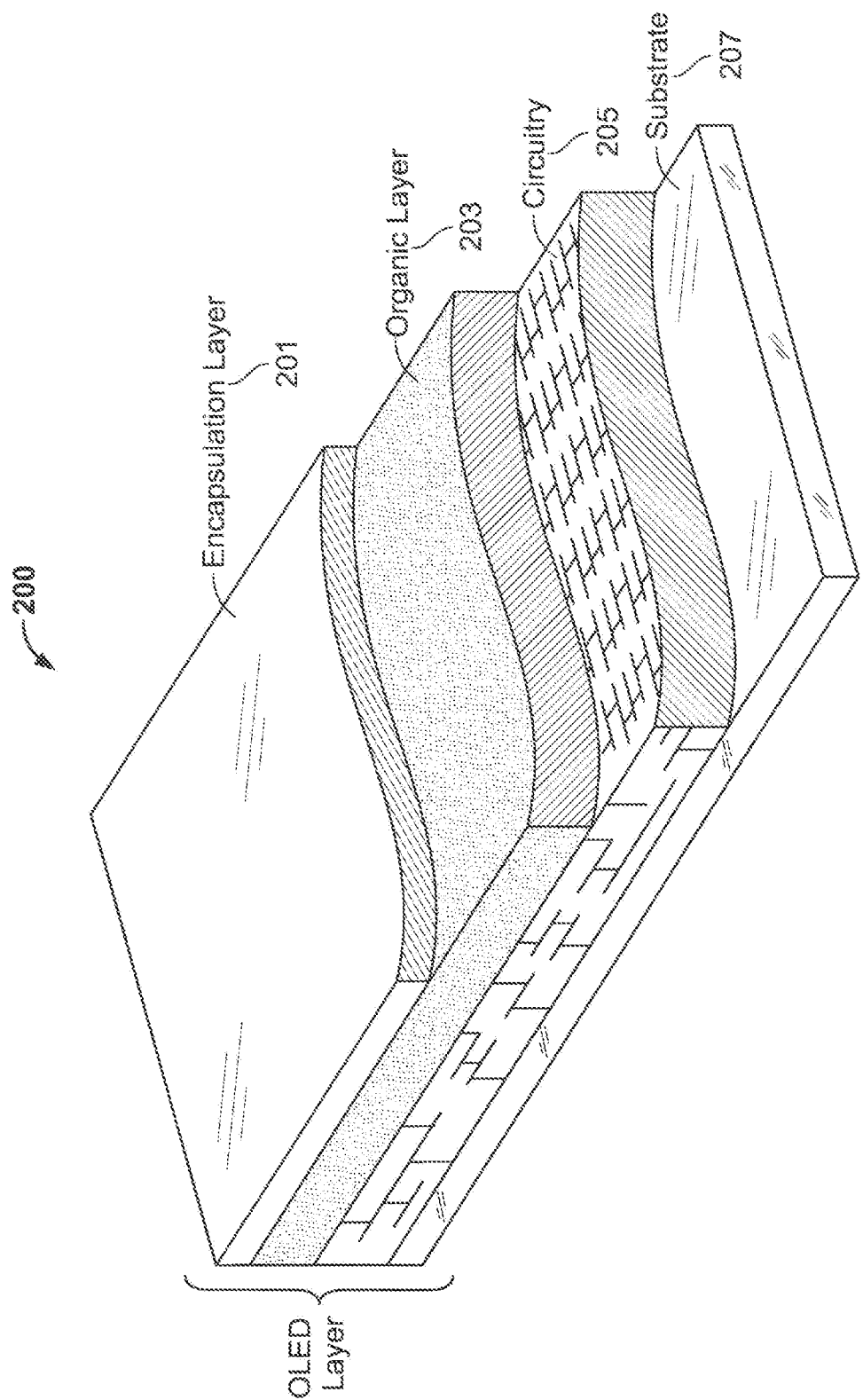
FIG. 2 shows yet another illustrative apparatus in accordance with principles of the disclosure.

FIG. 2 shows structures 200 of an illustrative OLED layer, such as OLED layer 101 (shown in FIG. 1). Structures 200 include four layers: encapsulation layer 201, organic layer 203, circuitry layer 205 and substrate layer 207.

Encapsulation layer 201 protects the OLED layer from exposure to oxygen, water and other contaminants. Preferably, encapsulation layer 201 is flexible and transparent. Glass and plastic are exemplary materials that may be used to construct encapsulation layer 201. When glass is used to construct encapsulation layer 201, the glass may be very thin and flexible. For example, the glass may be between 50 micrometers ("μm") and 100 μm thick.

In some embodiments, encapsulation layer 201 may be constructed using thin-film encapsulation techniques such as Atomic Layer Deposition ("ALD"). ALD is a process that utilizes chemicals that, when deposited on a material, react to create a solid, thin film.

Structures 200 include organic layer 203.

Organic layer 203 typically includes an emissive solid-state semiconductor. Organic layer 203 may be constructed from a thin film of organic (carbon-based) material. For example, organic layer 203 may include one or more OLEDs. When electricity is applied to an OLED within organic layer 203, electrons flow through organic layer 203 and release photons, thereby emitting light. Different types of emissive materials may be used. Each type of material may be associated with a different color light. An intensity of light emitted by organic layer 203 may be controlled by the amount of electricity flowing through organic layer 203.

Organic layer 203 may be doped with "host" materials. Host material may affect a property, such as power efficiency, of organic layer 203. For example, organic layer 203 may be doped with materials that improve its operation and/or achieve a desired color.

Organic layer 203 may include two or more sub-layers (not shown). For example, organic layer 203 may include 5, 10 or 15 sublayers. Illustrative sub-layers may include: (1) an electron transport layer, (2) a blocking layer, (3) an emissive layer, (4) a hole transport layer and (5) an injection layer.

For example, an emissive layer may be placed between a cathode and an anode. When electricity is applied, electrons flow from the cathode to the anode. OLED displays may be driven by electrical current or voltage. In a preferred embodiment, the OLED display is driven by current. The cathode inserts electrons into the emissive layer, and the anode removes the electrons. Electron "flow" through the emissive layer releases photons, generating light. The color of the generated light may be changed by including different types of materials within the emissive layer.

A direction of light emitted by organic layer 203 may be controlled by a degree of transparency of the anode and/or cathode. In some embodiments, a cathode may be reflective. Such a cathode may preferably be constructing using an aluminum based-compound or lithium fluoride. An anode may be transparent. A transparent anode may preferably be constructed using indium tin oxide. In such embodiments, when current flows between the cathode and anode, light is emitted through circuitry layer 205 and substrate layer 207. Circuitry layer 205 and substrate layer 207 may be transparent. Such embodiments may be referred to as "bottom-emitting OLEDs."

In some embodiments, the cathode may be transparent. Such a cathode may preferably be constructed using indium tin oxide. The anode may be reflective. The reflective anode may direct light toward the transparent cathode. Such embodiments may be referred to as "top-emitting OLEDs." Typically, top-emitting designs are more efficient and are used to construct higher resolution OLED displays.

Additionally, top-emitting designs may allow organic layer 203 to be formed on a non-transparent substrate. Small- and medium-sized OLED displays (e.g., 1-7 inches) are typically constructed using top-emitting techniques.

Organic layer 203 may include one or more pixels. Different architectures are available for forming pixels using OLEDs. One exemplary architecture includes positioning different color (e.g., red, green and blue) OLEDs adjacent to each other. Another exemplary architecture includes stacking different color OLEDs on top of each other. OLEDs may be stacked because materials used to construct organic layer 203 may be transparent. A stacked design may provide a smaller pixel size and higher resolution.

Structures 200 include circuitry layer 205. Circuitry layer 205 includes electronics that drive one or more pixels formed within organic layer 203. Preferably, amorphous silicon ("a-Si") and low temperature polysilicon ("LTPS") may be used to construct circuitry layer 205. In some embodiments, circuitry layer 205 may be transparent.

Substrate layer 207 supports circuitry layer 205, organic layer 203 and encapsulation layer 201. Substrate layer 201 may be constructed using various materials. For example, substrate layer 207 may be constructed using glass, plastic or metal materials. In some embodiments, such as in bottom-emitting OLEDs, substrate layer 207 may function as encapsulation layer 201.

Figure 3:
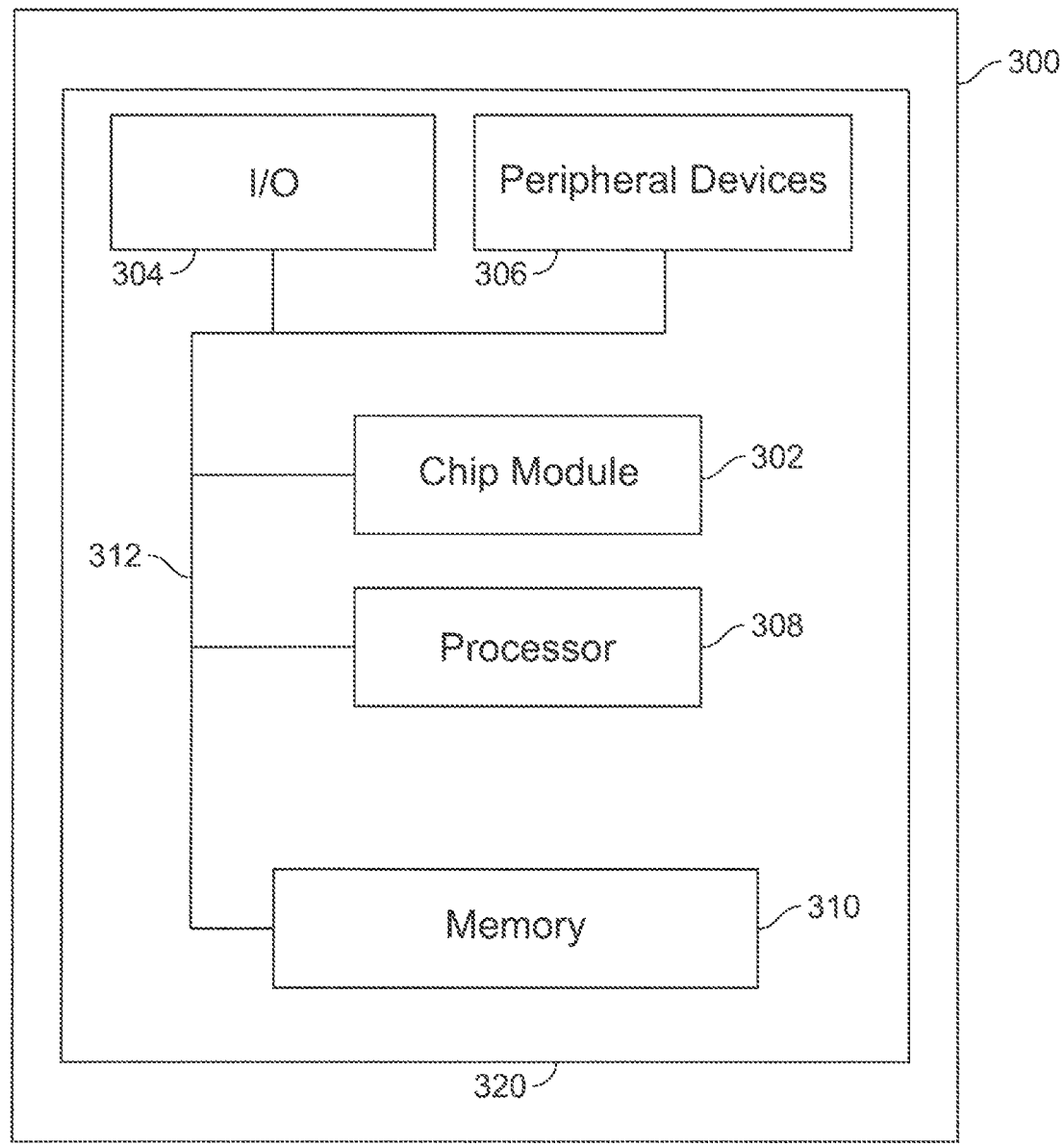
FIG. 3 shows still another illustrative apparatus in accordance with principles of the disclosure.

FIG. 3 shows illustrative software chip 300. Software chip 300 may include chip module 302, which may include one or more integrated circuits, and which may include logic configured to perform any suitable logical operation.

Software chip 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable encoded media or devices; peripheral devices 306, which may include counter timers, real-time timers, power-on reset generators or any other suitable peripheral devices; logical processing device 308, which may compute data structural information, structural parameters of the data, quantify indices; and machine-readable memory 310.

Machine-readable memory 310 may be configured to store, in machine-readable data structures: sensitive data, value, currency, currency exchange rates, location information, transaction histories, electronic signatures of biometric features or any other suitable information or data structures.

Components 302, 304, 306, 308 and 310 may be coupled together by a system bus or other interconnections 312 and may be present on one or more OLED devices such as OLED device 320. In some embodiments, the components may be integrated into a single chip. The chip may be silicon-based.

FIGS. 4-9 show illustrative layers that may be present within an illustrative OLED device.

Figure 4:
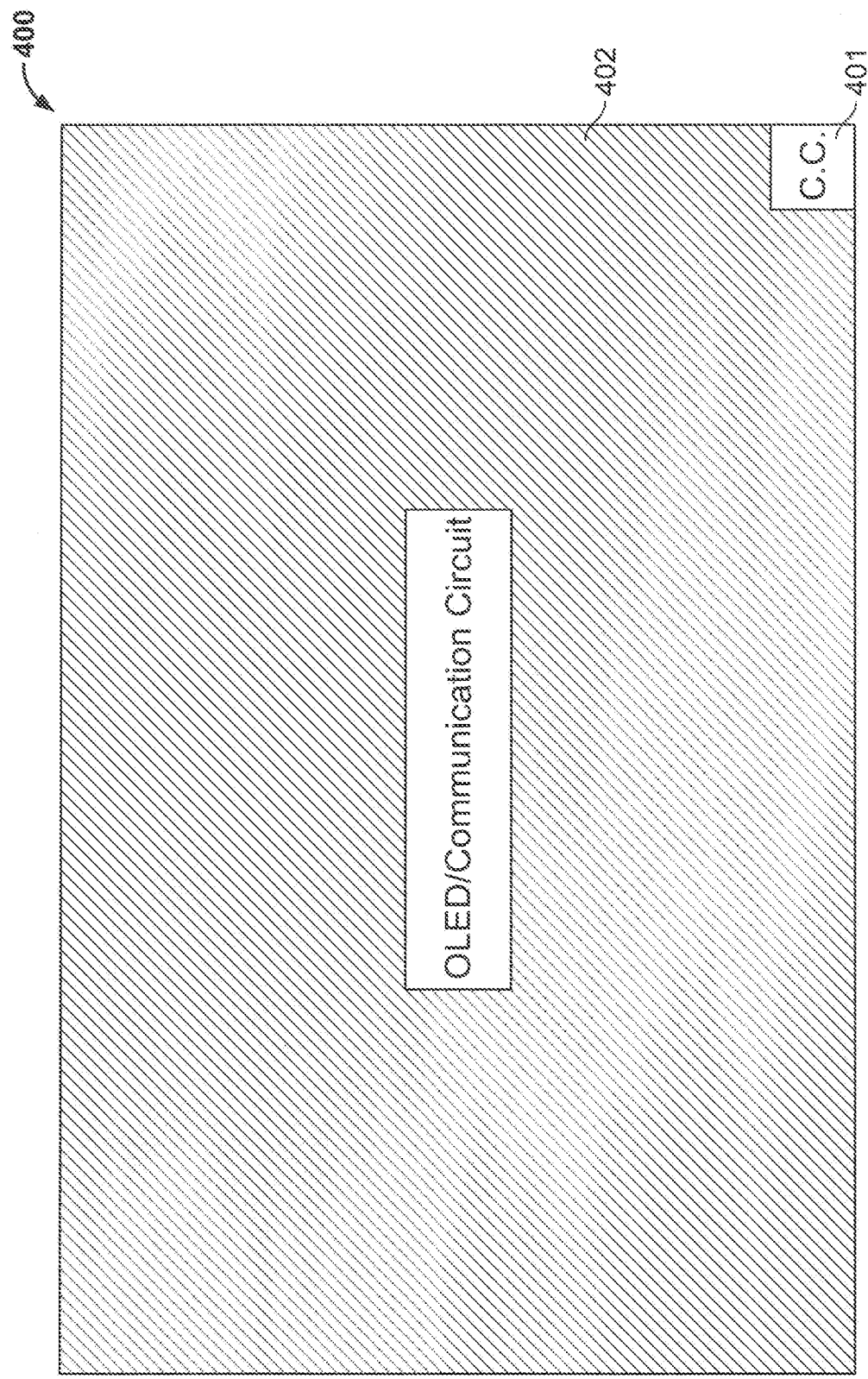
FIG. 4 shows another illustrative apparatus in accordance with principles of the disclosure.

FIG. 4 shows illustrative layer 402. Layer 402 includes OLED layer (such as OLED layer 200, shown in FIG. 2). FIG. 4 also shows that, in some embodiments, communication circuit 401 may penetrate layer 402.

Figure 5:
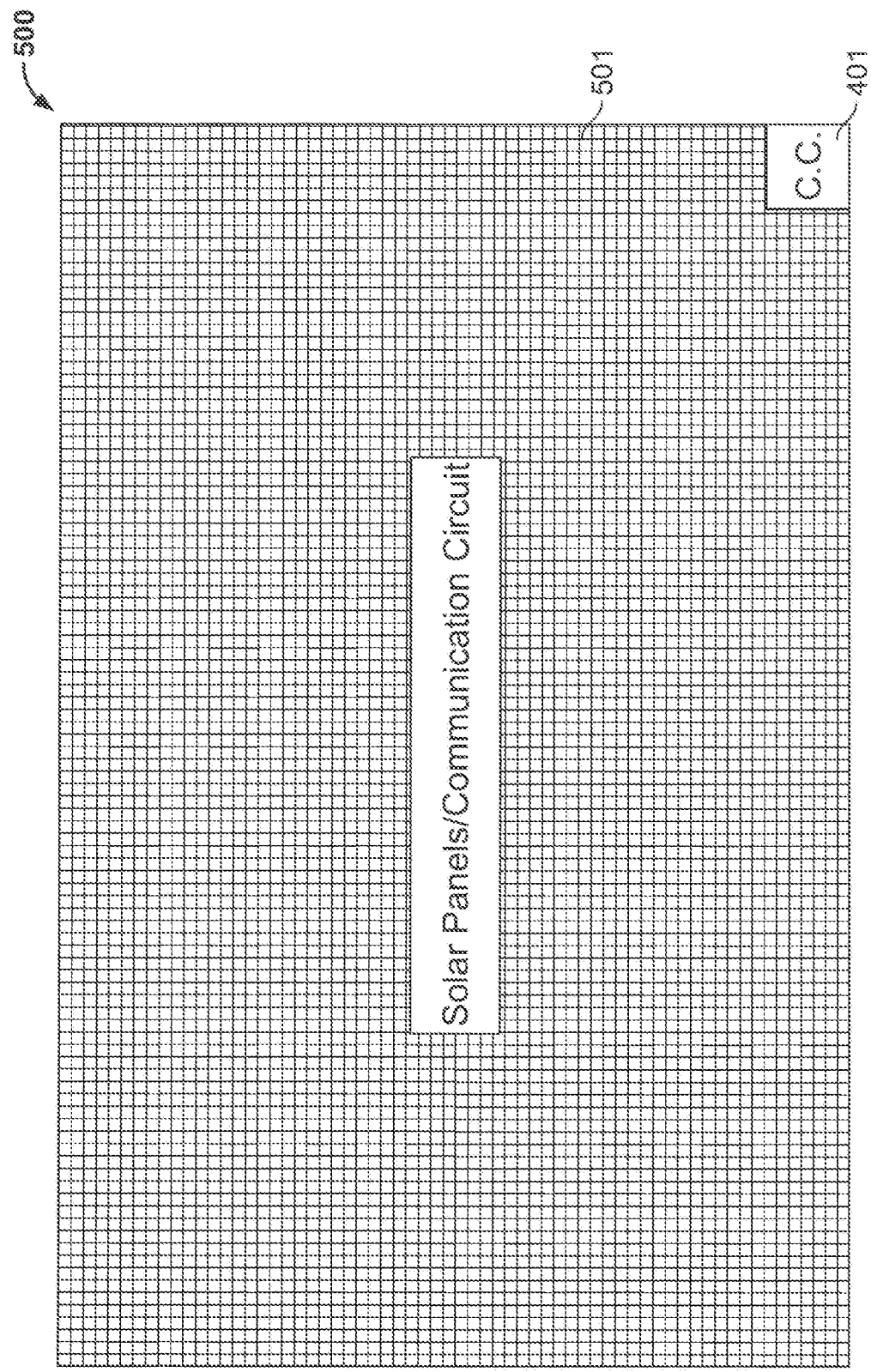
FIG. 5 shows yet another illustrative apparatus in accordance with principles of the disclosure.

FIG. 5 shows illustrative layer 500. Layer 500 includes solar panels 501 that may be used to power various components of an OLED device (e.g., circuitry layer 205, shown in FIG. 2). FIG. 5 also shows that, in some embodiments, communication circuit 401 may penetrate layer 500.

Figure 6:
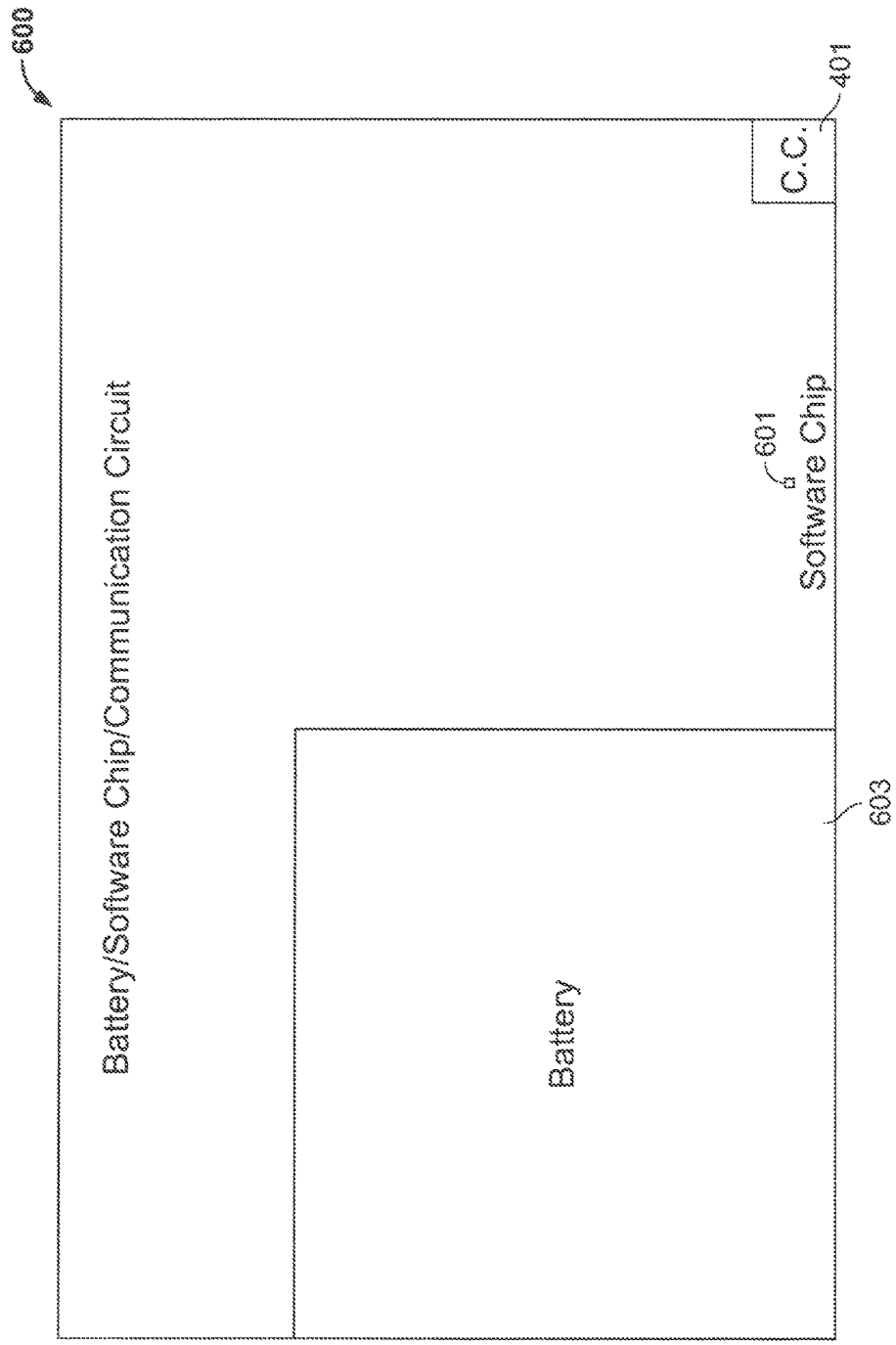
FIG. 6 shows still another illustrative apparatus in accordance with principles of the disclosure.

FIG. 6 shows illustrative layer 600. Layer 600 includes software chip 601. Software chip 601 may include one or more features of software chip 109 (shown in FIG. 1). Layer 600 includes battery 603. Battery 603 may include one or more features of battery layer 105 (shown in FIG. 1A). FIG. 6 shows that, in some embodiments, communication circuit 401 may penetrate layer 600.

Figure 7:
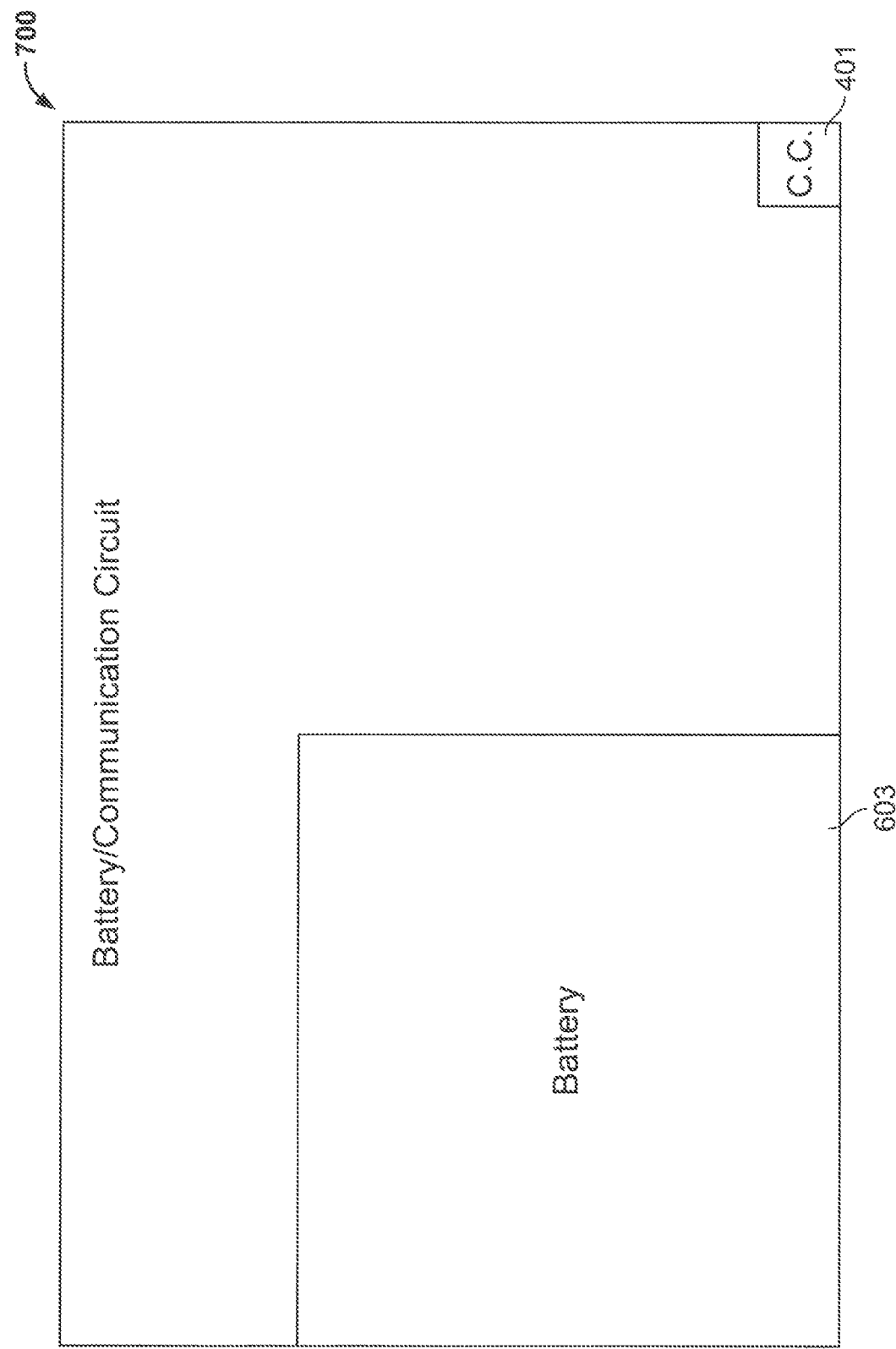
FIG. 7 shows another illustrative apparatus in accordance with principles of the disclosure.

FIG. 7 shows illustrative layer 700. FIG. 7 shows that, in some embodiments, battery 603 may penetrate layer 700. FIG. 7 shows that, in some embodiments, communication circuit 401 may penetrate layer 700.

Figure 8:
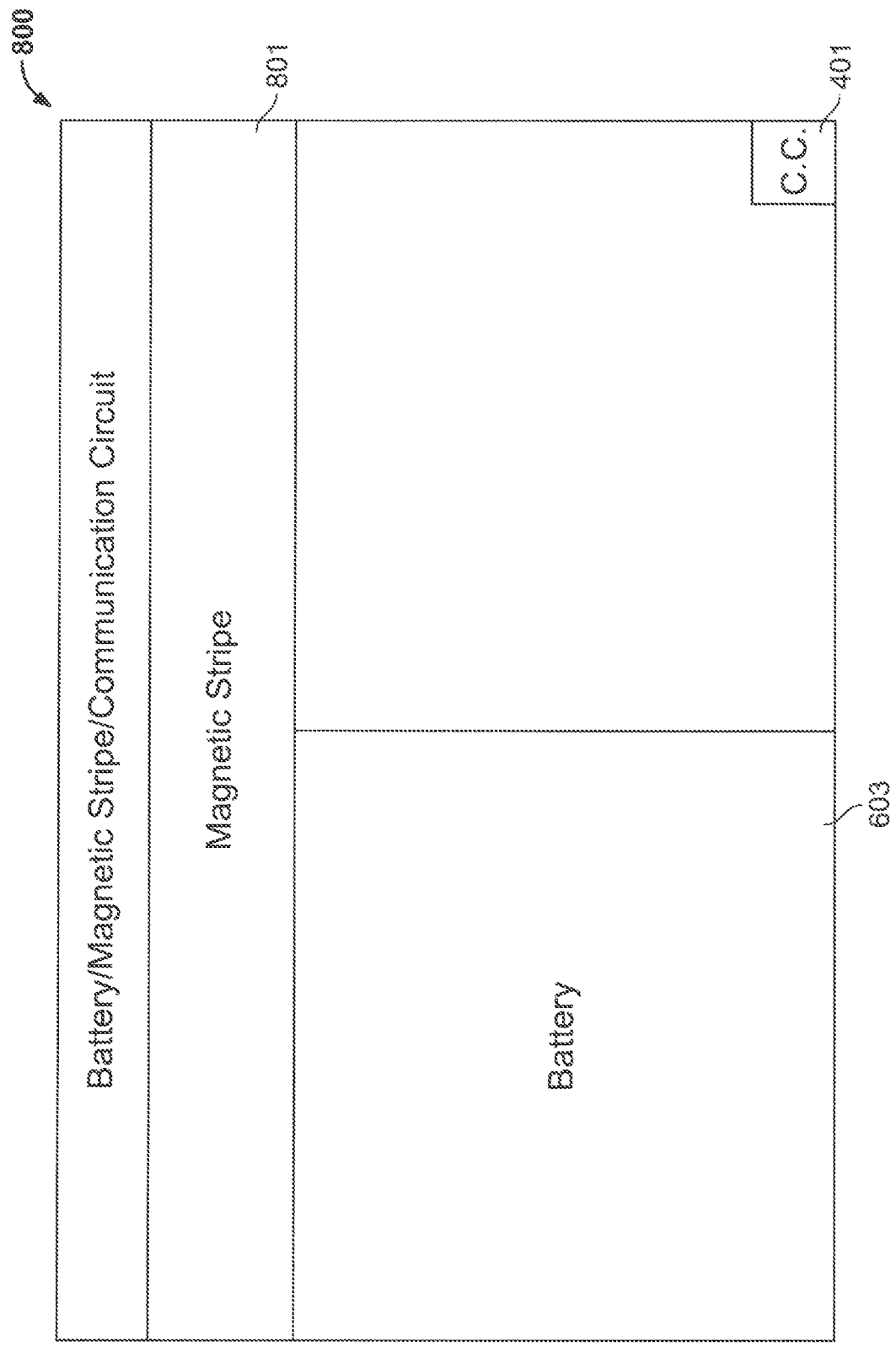
FIG. 8 shows yet another illustrative apparatus in accordance with principles of the disclosure.

FIG. 8 shows illustrative layer 800. FIG. 8 shows that, in some embodiments, battery 603 may penetrate layer 800. FIG. 8 shows that, in some embodiments, communication circuit 401 may penetrate layer 800.

FIG. 8 shows that layer 800 may include magnetic stripe 801. Magnetic stripe 801 may include magnetically encoded information. Magnetic stripe 801 may provide backwards compatibility for OLED devices described herein.

Figure 9:
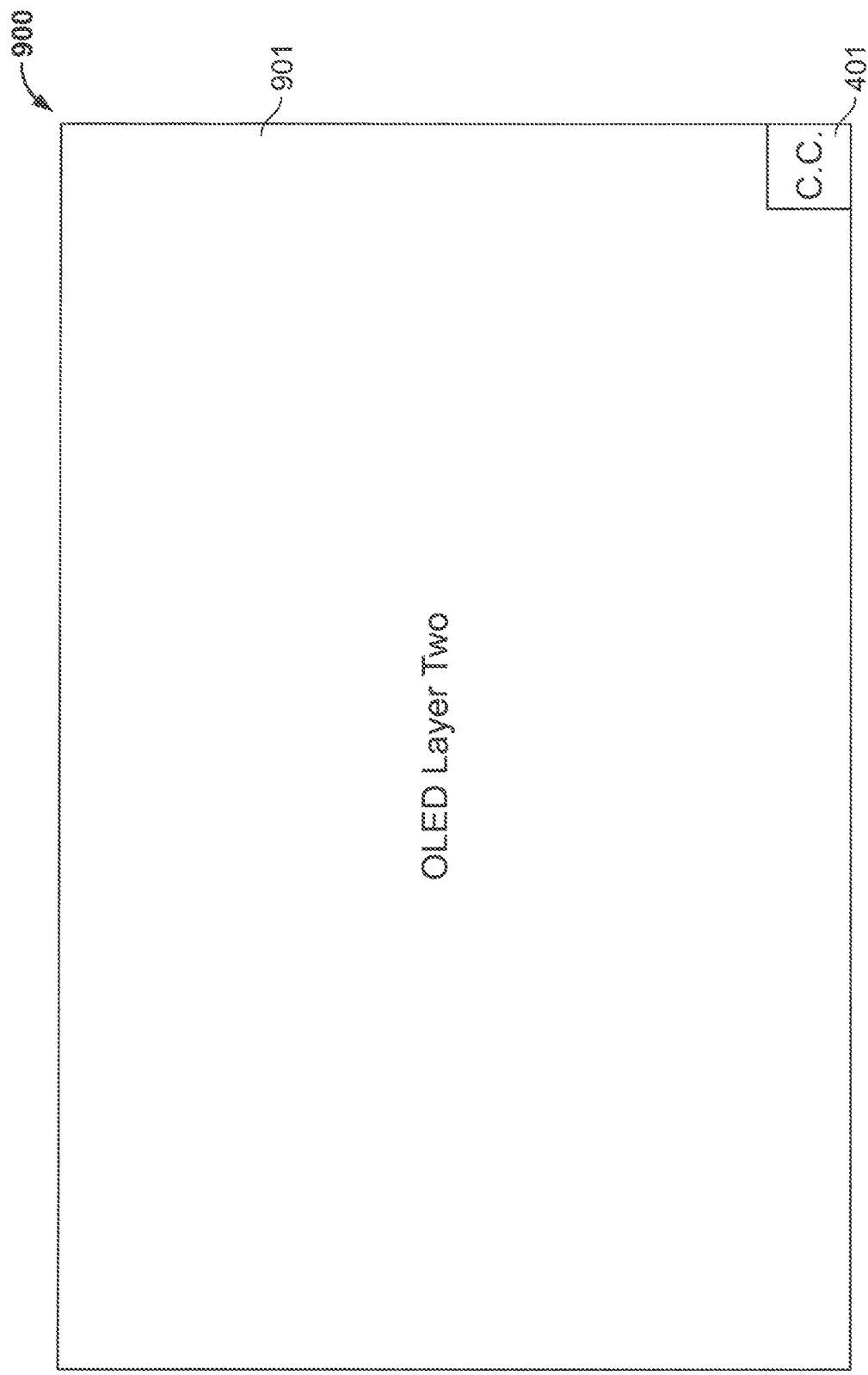
FIG. 9 shows still another illustrative apparatus in accordance with principles of the disclosure.

FIG. 9 shows illustrative layer 900. Layer 900 includes a second OLED layer 901. Second OLED layer 901 may include one or more features of OLED layer 200 (shown in FIG. 2). Second OLED layer 901 may allow front and back faces of an OLED device to include an OLED display. FIG. 9 also shows that communication circuit 401 may penetrate layer 900.

Figure 10:
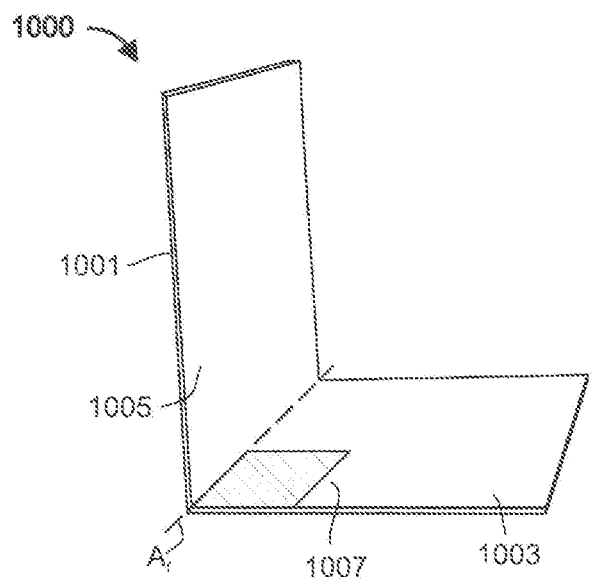
FIG. 10 shows another illustrative apparatus in accordance with principles of the disclosure.

FIG. 10 shows illustrative perspective 1000. Perspective 1000 includes screen 1001 of an OLED device. Screen 1001 may be distinct from other components of the OLED device. Alternatively, screen 1001 may contain, or be integrated with, all other components of the OLED device. Screen 1001 may be removeable from other components of the OLED device. An actual embodiment of screen 1001 may be thinner or thicker than shown.

Screen 1001 may be reshape-able. Screen 1001 may be reshaped along axis $A_f$. Reshaping screen 1001 may alternatively refer herein to bending, flexing, creasing, crimping, and/or rolling the screen. Reshaping screen 1001 along axis $A_f$ may divide screen 1001 into sections 1003 and 1005. In this embodiment, reshaping the screen about axis $A_f$ may form a maximum angle of substantially 90 degrees. A maximum angle of substantially 90 degrees may enable an article to be placed on one section against the other section at axis $A_f$ without shifting.

Reshaping screen 1001 may form predetermined space 1007 on section 1003. Predetermined space 1007 may have the dimensions of an article. The dimensions may be 85.60 mm×53.98 mm (3⅜ in×2⅛ in) and rounded corners with a radius of 2.88-3.48 mm (about ⅛ in). These dimensions correspond to the size of a standard card according to the ID-1 (CR-80) format specified by the International Organization for Standardization (ISO). Alternatively, the dimensions may be 138.4 mm×67.3 mm. These dimensions may correspond to a typical mobile phone. The dimensions may also be smaller than a typical mobile phone. In some embodiments, screen 1001 may display a region on section 1003 representing the predetermined space for placement of the article. The OLED device may display a different region depending on the article to be authenticated in a transaction.

Screen 1001 may include a verification sensor in the region of the predetermined space 1007. In some embodiments, screen 1001 may include a second verification sensor in section 1005, proximal to axis $A_f$. The second verification sensor may measure a thickness of an article placed in the predetermined space. For example, a measured thickness of ¹⁄₃₂ inches may verify the presence of a payment card compliant with ISO standards.

In certain embodiments, OLED device 1000 may provide directions regarding where and how to reshape screen 1001. The directions may include a line displayed on screen 1001 with accompanying suitable directives. The line may indicate where to reshape screen 1001. The line may be displayed in the location desired for axis $A_f$. The location desired for axis $A_f$ may be determined in relation to the locations of verification sensors. The determination may enable the verification sensors to detect an article and/or capture information desired for an exchange.

Figure 11:
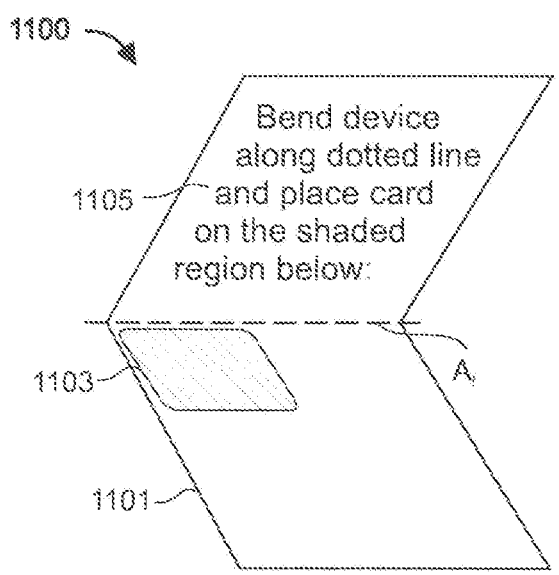
FIG. 11 shows yet another illustrative apparatus in accordance with principles of the disclosure.

FIG. 11 shows OLED device 1100. OLED device 1100 includes screen 1101. Screen 1101 may be distinct from other components of the OLED device. Alternatively, screen 1101 may contain, or be integrated with, all other components of the OLED device. Screen 1101 may be removeable from other components of the OLED device. An actual embodiment of screen 1101 may be thinner or thicker than shown.

Screen 1101 may display a dotted line along a location desired for axis $A_f$. Screen 1101 is shown displaying directions 1105. In this example, directions 1105 include the text: "Bend device along dotted line and place card in the shaded region below." Shaded region 1103 may be displayed on the screen for positioning a card. Shaded region 1103 may be the predetermined space. Directions 1105 may alternatively include any suitable directions for reshaping a screen and positioning an article.

Figure 12:
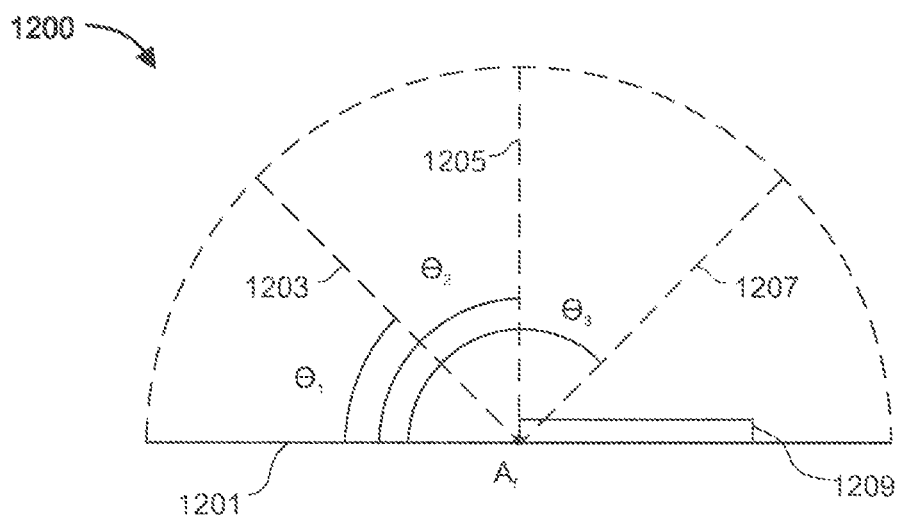
FIG. 12 shows an illustrative diagram in accordance with principles of the disclosure.

FIG. 12 shows illustrative diagram 1200. Illustrative diagram 1200 shows a side view of OLED device 1201 in a default planar state. Indicators 1203, 1205, and 1207 show the positions of exemplary configurations of OLED device 1201 in a reshaped, or bent, state. OLED device 1201 may be reshaped along axis $A_f$. Article 1209 may be an article positioned in the predetermined space that is proximal to axis $A_f$.

Indicator 1203 is associated with a reshaped state with a maximum angle of $\theta_1$. $\theta_1$ may be measured as the angle formed, at axis $A_f$ between OLED device 1201 in a planar state and in a reshaped state represented by indicator 1203. Indicators 1205 and 1207 are similarly associated with maximum angles $\theta_2$ and $\theta_3$. In diagram 1200, axis $A_f$ may be include a sharp, angular, crease when OLED device 1201 is reshaped.

Figure 13:
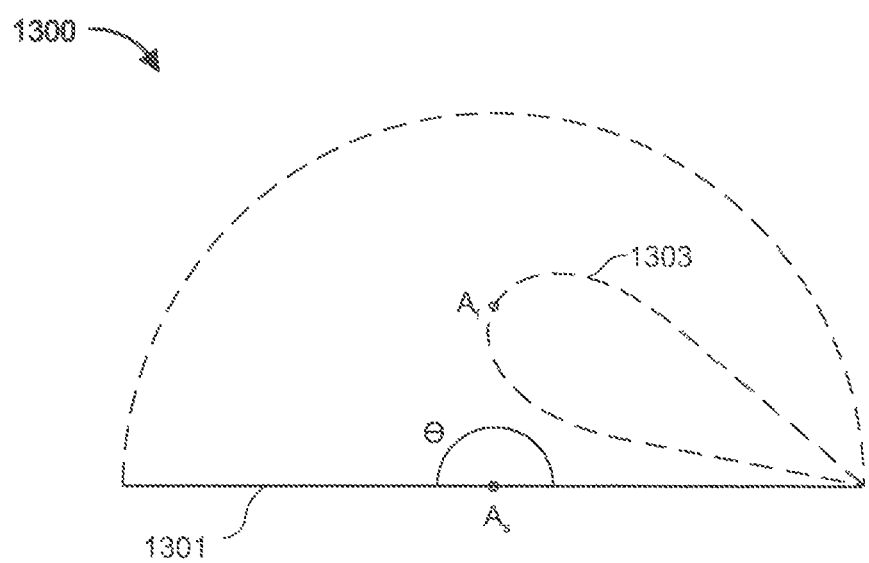
FIG. 13 shows another illustrative diagram in accordance with principles of the disclosure.

In some other embodiments, axis $A_f$ may include a rounded reshaping of an OLED device. In the some other embodiments, the maximum angle may be measured around a simulated axis $A_s$. FIG. 13 shows illustrative diagram 1300. Diagram 1300 shows a side view of OLED device 1301 in a default planar state. Indicator 1303 shows an exemplary outline of OLED device 1301 in a rounded reshaped state along axis $A_f$. Diagram 1300 shows simulated axis $A_s$ and maximum angle $\theta$ measured at simulated axis $A_s$. The location of simulated axis $A_s$ may be determined by superimposing a semicircular, protractor-like, diagram over a baseline representing a side view of the OLED device in a planar state. The two endpoints of the baseline represent a first and second end of the OLED device. The OLED device may then be reshaped into a rounded reshaped state, keeping one endpoint fixed and moving the other endpoint along the perimeter of the semicircle until a maximum bend is achieved. Simulated axis $A_s$ may be positioned on the baseline at the point an axis would form had the OLED device been a rigid form bending along a hinged axis. Angle $\theta$ in diagram 1300 may be substantially 180 degrees.

Figure 14:
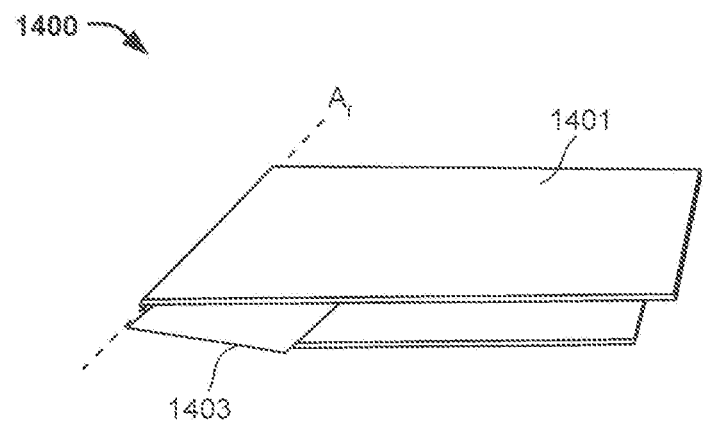
FIG. 14 shows an illustrative apparatus in accordance with principles of the disclosure.

FIG. 14 shows illustrative perspective 1400. Perspective 1400 includes screen 1401 of an OLED device. Screen 1401 may be distinct from other components of the OLED device. Alternatively, screen 1401 may contain, or be integrated with, all other components of the OLED device. Screen 1401 may be removeable from other components of the OLED device. An actual embodiment of screen 1401 may be thinner or thicker than shown.

Screen 1401 may be reshape-able. Reshaping screen 1401 may follow axis $A_f$. Reshaping screen 1401 may alternatively be referred to herein as bending, flexing, creasing, crimping, and/or rolling the screen. In this embodiment, reshaping the screen about axis $A_f$ may form a maximum angle of substantially 180 degrees. A maximum angle of substantially 180 degrees may fold screen 1401 onto itself along axis $A_f$.

Folding screen 1401 onto itself along axis $A_f$ may form a predetermined interstitial space along axis $A_f$. Article 1403 may be positioned tightly and securely within the predetermined space. Article 1403 may be a payment instrument such as a credit card. In one embodiment, verification sensors may be disposed at one side of the fold to detect and/or capture information about one side of article 1403. In other embodiments, verification sensors may be disposed at both sides of the fold to detect and/or capture information about two sides of article 1403. In still other embodiments, verification sensors may be disposed at axis $A_f$ to detect and/or capture information about an edge of article 1403.

Figure 15:
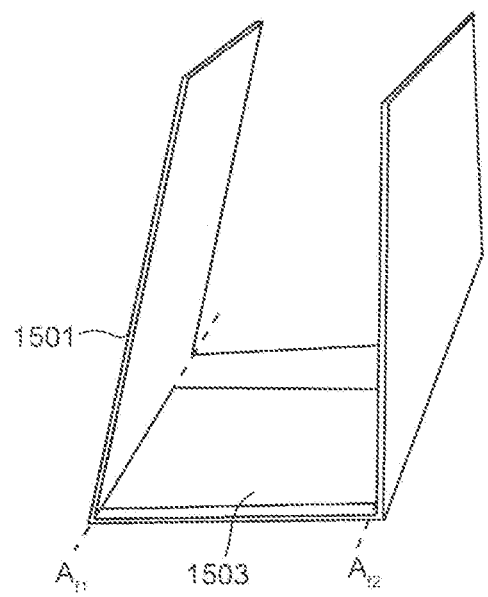
FIG. 15 shows another illustrative apparatus in accordance with principles of the disclosure.

FIG. 15 shows illustrative perspective 1500. Perspective 1500 includes screen 1501 of an OLED device. Screen 1501 may be distinct from other components of the OLED device. Alternatively, screen 1501 may contain, or be integrated with, all other components of the OLED device. Screen 1501 may be removeable from other components of the OLED device. An actual embodiment of screen 1501 may be thinner or thicker than shown.

Screen 1501 may be reshape-able. Screen 1501 may reshape along axis $A_{f1}$ and also along axis $A_{f2}$. Reshaping screen 1501 may alternatively refer herein to bending, flexing, creasing, crimping, and/or rolling the screen. In this embodiment, the maximum angles formed by reshaping the screen along axis $A_{f1}$ and also along axis $A_{f2}$ may each be substantially 90 degrees.

Folding screen 1501 along axis $A_{f1}$ and also along axis $A_{f2}$ may form a predetermined space in between the axes. Article 1503 may be preferably positioned tightly and securely within the predetermined space. Article 1503 may be a payment instrument such as a credit card. In one embodiment, verification sensors may be disposed in screen 1501 below article 1503 to detect and/or capture information about one face of article 1503. In other embodiments, verification sensors may be disposed at one or both edges of article 1503. For example, the verification sensors may detect a thickness of article 1503. In still other embodiments, verification sensors may be disposed in screen 1501 to detect a distance between axis $A_{f1}$ and axis $A_{f2}$. The locations of axis $A_{f1}$ and axis $A_{f2}$ may be determined by reshaping screen 1501 around the edges of article 1503. Thus, a distance between axis $A_{f1}$ and axis $A_{f2}$ may indicate a dimension of article 1503.

Figure 16:
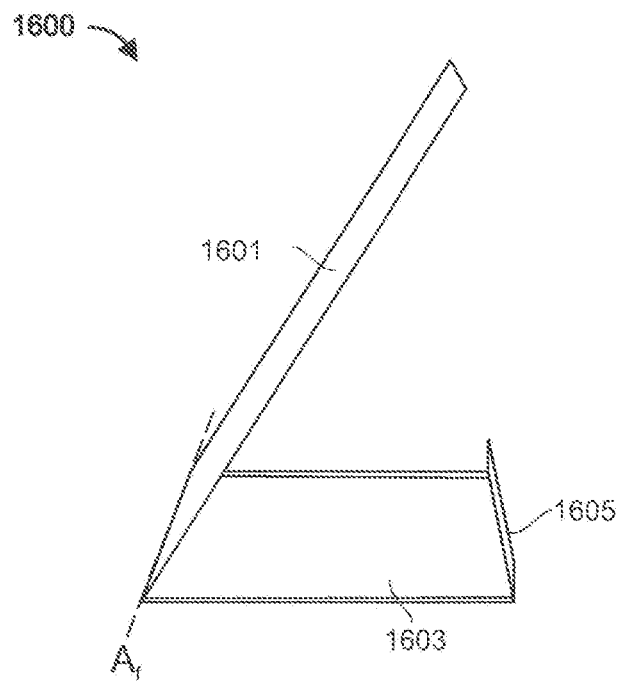
FIG. 16 shows yet another illustrative apparatus in accordance with principles of the disclosure.

FIG. 16 shows illustrative perspective 1600. Perspective 1600 includes screen 1601 of an OLED device. Screen 1601 may be distinct from other components of the OLED device. Alternatively, screen 1601 may contain, or be integrated with, all other components of the OLED device. Screen 1601 may be removeable from other components of the OLED device. An actual embodiment of screen 1601 may be thinner or thicker than shown.

Screen 1601 may be reshape-able. Reshaping screen 1601 may follow axis $A_f$. Reshaping screen 1601 may alternatively refer herein to bending, flexing, creasing, crimping, and/or rolling the screen. Screen 1601 may include notch 1605. Notch 1605 may be formed on screen 1601. Notch 1605 may be formed at an edge of screen 1601. Alternatively, notch 1605 may be formed on a component of the OLED device that is proximal to screen 1601. Article 1603 may be positioned on screen 1601 with one edge against, or otherwise engaged with, notch 1605. Notch 1605 may prevent article 1603 from shifting. Article 1603 may be a payment instrument such as a credit card.

Folding screen 1601 along axis $A_f$ may form a predetermined space between axis $A_f$ and notch 1605. Article 1603 may be positioned tightly and securely within the predetermined space. In one embodiment, the position of axis $A_f$ may be determined by article 1603. One edge of article 1603 may be placed against notch 1605 and screen 1601 reshaped against an opposing edge of article 1603. A verification sensor may detect a distance between axis $A_f$ and notch 1605. The distance may indicate a dimension of article 1603. Other verification sensors may be disposed in screen 1601 to capture other information about article 1603.

Figure 17:
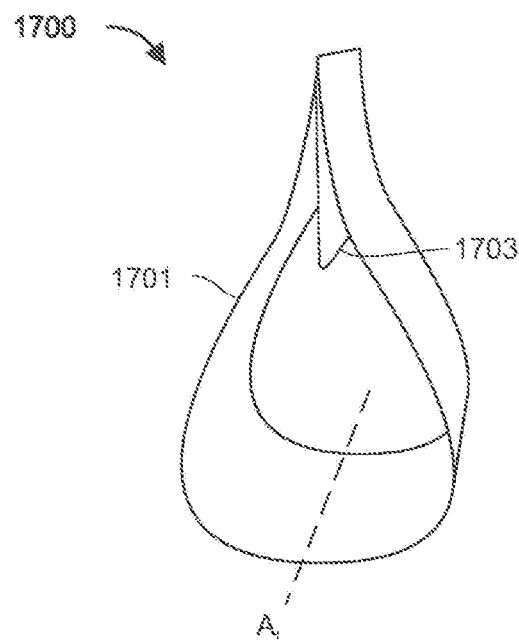
FIG. 17 shows still another illustrative apparatus in accordance with principles of the disclosure.

FIG. 17 shows illustrative perspective 1700. Perspective 1700 includes screen 1701 of an OLED device. Screen 1701 may be distinct from other components of the OLED device. Alternatively, screen 1701 may contain, or be integrated with, all other components of the OLED device. Screen 1701 may be removeable from other components of the OLED device. An actual embodiment of screen 1701 may be thinner or thicker than shown.

Screen 1701 may be reshape-able. Reshaping screen 1701 may form a rounded reshaping along axis $A_f$. Reshaping screen 1701 may alternatively refer herein to bending, flexing, and/or rolling the screen. In this embodiment, reshaping the screen about axis $A_f$ may form a maximum angle of substantially 180 degrees. A maximum angle of substantially 180 degrees may, at least in part, fold screen 1701 onto itself along axis $A_f$.

Folding screen 1701 onto itself along axis $A_f$ may form a predetermined space in the interstitial space of the fold aligned with axis $A_f$. Article 1703 may be preferably positioned tightly and securely within the predetermined space when sandwiched by two sections of screen 1701 that are brought proximal to each other by the reshaping. Article 1703 may be suspended opposite, and without contacting, axis $A_f$. Article 1703 may be a payment instrument such as a credit card. In one embodiment, verification sensors may be disposed in one of the sections of screen 1701 to detect and/or capture information about one side of article 1703. In other embodiments, verification sensors may be disposed in both of the sections of screen 1701 to detect and/or capture information about two sides of article 1703. In still other embodiments, verification sensors may be disposed at axis $A_f$ to detect and/or capture information about an edge of article 1703.

Figure 18:
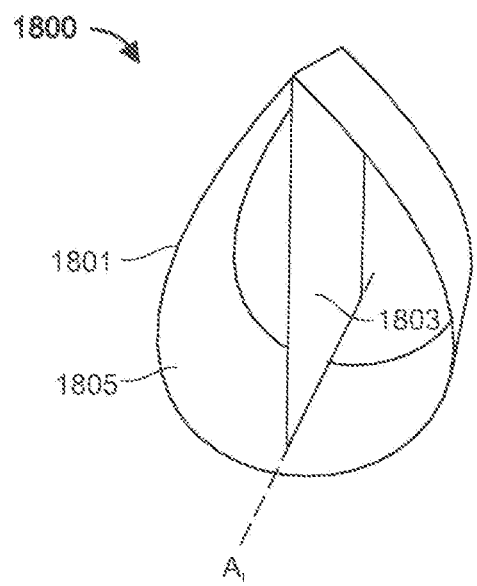
FIG. 18 shows another illustrative apparatus in accordance with principles of the disclosure.

FIG. 18 shows illustrative perspective 1800. Perspective 1800 includes screen 1801 of an OLED device. Screen 1801 may be distinct from other components of the OLED device. Alternatively, screen 1801 may contain, or be integrated with, all other components of the OLED device. Screen 1801 may be removeable from other components of the OLED device. An actual embodiment of screen 1801 may be thinner or thicker than shown.

Screen 1801 may be reshape-able. Reshaping screen 1801 may form a rounded reshaping along axis $A_f$. Reshaping screen 1801 may alternatively refer herein to bending, flexing, and/or rolling the screen. In this embodiment, reshaping the screen about axis $A_f$ may form a maximum angle of substantially 180 degrees. In this embodiment, a maximum angle of substantially 180 degrees may not fold screen 1801 onto itself. Instead, reshaping screen 1801 may roll screen 1801 into a circular shape with two ends of screen 1801 brought proximal to each other opposite axis $A_f$.

Rolling screen 1801 onto itself along axis $A_f$ may form a predetermined space within the circular shape and aligned with axis $A_f$. Article 1803 may be positioned within the predetermined space when clamped between the two ends of screen 1801 that are brought proximal to each other by the reshaping. Article 1803 may be positioned with an edge against axis $A_f$. Article 1803 may be a payment instrument such as a credit card. In one embodiment, verification sensors may be disposed at location 1805 of screen 1801 to detect and/or capture information about one face of article 1803. In other embodiments, verification sensors may be disposed at both location 1805 and a location symmetrically opposed to location 1805. The verification sensors may thereby detect and/or capture information about two faces of article 1803. Alternatively, one verification sensor may direct a wave at the symmetrically opposed sensor. The OLED device may detect article 1803 and/or capture information by analyzing the waves received by the sensor and the symmetrically opposed verification sensor. In still other embodiments, verification sensors may be disposed at axis $A_f$ to detect and/or capture information about an edge of article 1803.

Figure 19:
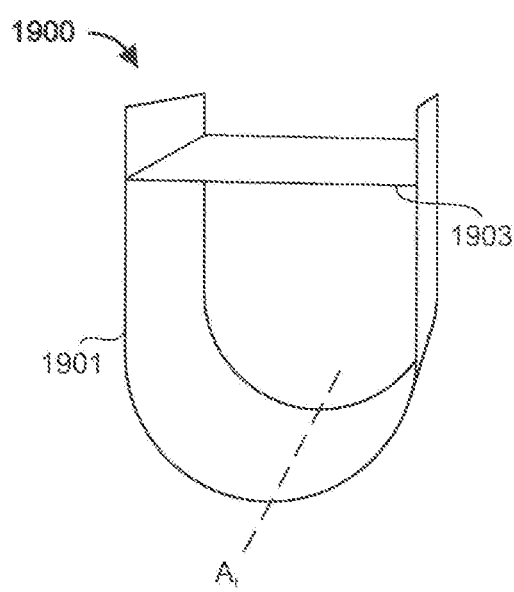
FIG. 19 shows yet another illustrative apparatus in accordance with principles of the disclosure.

FIG. 19 shows illustrative perspective 1900. Perspective 1900 includes screen 1901 of an OLED device. Screen 1901 may be distinct from other components of the OLED device. Alternatively, screen 1901 may contain, or be integrated with, all other components of the OLED device. Screen 1901 may be removeable from other components of the OLED device. An actual embodiment of screen 1901 may be thinner or thicker than shown.

Screen 1901 may be reshape-able. Reshaping screen 1901 may form a rounded reshaping along axis $A_f$. Reshaping screen 1901 may alternatively refer herein to bending, flexing, and/or rolling the screen. In this embodiment, reshaping the screen about axis $A_f$ may form a U-shaped configuration. Two ends of screen may form the top two points of the U shape. Axis $A_f$ may be at the midpoint of the rounded bottom of the U shape.

Reshaping screen 1901 into a U shape may form a predetermined space spanning the top of the U and facing axis $A_f$. Article 1903 may be positioned within the predetermined space when clamped, at two opposing edges of article 1903, between the two ends of screen 1901 that form the top points of the U shape. Article 1903 may be positioned facing axis $A_f$. Article 1803 may be a payment instrument such as a credit card. In one embodiment, verification sensors may be disposed in one of the ends of screen 1901 to detect and/or capture information about one edge of article 1903. In other embodiments, verification sensors may be disposed in both of the ends of screen 1901 to detect and/or capture information about two edges of article 1903. In still other embodiments, verification sensors may be disposed at axis $A_f$ to detect and/or capture information about a face of article 1903.

Figure 20:
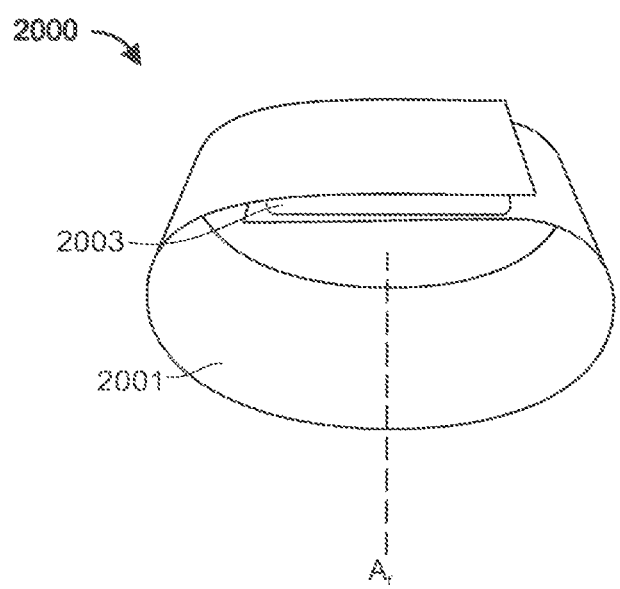
FIG. 20 shows still another illustrative apparatus in accordance with principles of the disclosure.

FIG. 20 shows illustrative perspective 2000. Perspective 2000 includes screen 2001 of an OLED device. Screen 2001 may be distinct from other components of the OLED device. Alternatively, screen 2001 may contain, or be integrated with, all other components of the OLED device. Screen 2001 may be removeable from other components of the OLED device. An actual embodiment of screen 2001 may be thinner or thicker than shown.

Screen 2001 may be reshape-able. Reshaping screen 2001 may form a rounded reshaping along axis $A_f$. Reshaping screen 2001 may alternatively refer herein to bending, flexing, and/or rolling the screen. In this embodiment, reshaping screen 2001 may roll screen 2001 into a circular shape. A section of a front surface of screen 2001 may overlap and face a section of a back surface of screen 2001. The two sections may overlap opposite axis $A_f$.

Rolling screen 2001 may form a predetermined space in the interstitial space between the sections. Article 2003 may be positioned tightly and securely within the predetermined space when sandwiched by the two sections of screen 2001 that overlap by the reshaping. Article 2003 may be a payment instrument such as a credit card. In one embodiment, verification sensors may be disposed in one of the sections of screen 2001 to detect and/or capture information about one side of article 2003. In other embodiments, verification sensors may be disposed in both of the sections of screen 2001 to detect and/or capture information about two sides of article 2003.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for OLED devices shape-able to position a payment device are provided. Persons skilled in the art will appreciate that the present invention can be practiced by other than the described embodiments, which are presented for purposes of illustration rather than of limitation, and that the present invention is limited only by the claims that follow.

What is claimed is:

1. A reshape-able organic light emitting diode (OLED) device for defining a predetermined space for positioning a payment instrument, said OLED device comprising:
    a screen including an array of OLEDs;
    a power source for illuminating the screen;
    a processor circuit comprising a non-transitory memory and a processor; and
    one or more verification sensors;
wherein:
    the screen is configured to be reshape-able;
    the screen, when reshaped, defines a predetermined space in at least one dimension, said space for positioning a payment instrument relative to the verification sensors; and
    the OLED device, responsive to a request from the processor circuit, detects the payment instrument in the predetermined space via at least one of the verification sensors;
and wherein:
    the OLED device further comprises a linear indicator formed thereon, the linear indicator for indicating the location of an axis along which to reshape the screen, and the predetermined space is defined relative to the axis, and wherein the linear indicator is a line displayed on the screen.

2. The OLED device of claim 1, defining a front surface and a back surface, and further comprising a first verification sensor embedded in a section of the front surface, and a second verification sensor embedded in a section of the back surface, and wherein:
    the OLED device is configured to be rolled such that the section of the front surface overlaps and faces the section of the back surface, the interstitial space between the facing sections forming the predetermined space;
    the first verification sensor detects one side of the payment instrument in the predetermined space; and
    the second verification sensor detects another side of the payment instrument in the predetermined space.

3. The OLED device of claim 1, wherein at least one verification sensor includes an OLED as a light sensor, said OLED as a light sensor including at least one OLED from the array of OLEDs, wherein the at least one OLED is toggled between a display mode and a sensing mode.

4. The OLED device of claim 1, wherein the screen includes a flexible material for configuring the screen to be reshape-able.

5. The OLED device of claim 1, wherein the screen includes at least one hinge connecting at least two parts of the screen, said hinge for configuring the screen to be reshape-able.

6. The OLED device of claim 1, wherein the screen is configured to form a crease along an axis along which the screen reshapes, and the screen, when reshaped, forms a maximum angle of substantially 180 degrees, thereby folding the screen onto itself, said maximum angle measured as the angular difference about the axis between the screen in a planar state and the screen in a reshaped state.

7. The OLED device of claim 1, further comprising a first verification sensor embedded at a first location on the OLED device, and a second verification sensor embedded at a second location on the OLED device, the first and second locations separated by an axis along which the screen reshapes, and wherein, when a payment instrument is positioned in the predetermined space, the first verification sensor detects a first side of the payment instrument, and the second verification sensor detects a second side of the payment instrument.

8. The OLED device of claim 1, further comprising a first axis along which the screen reshapes and a second axis along which the screen reshapes, wherein the screen, when reshaped along the first axis and also reshaped along the second axis, defines a predetermined space bound by the first and second axes, said space for positioning a payment instrument in relation to the verification sensors.

9. The OLED device of claim 1, wherein the predetermined space defines at least one dimension of the three-dimensional geometry of a standardized card as defined by ISO/IEC 7810# ID-1, said geometry being 3⅜ inches×2⅛ inches×1/32 inches.

10. The OLED device of claim 1, wherein at least one of the verification sensors is a camera, a tactile sensor, or an infrared sensor that is embedded within the array of OLEDs.

11. The OLED device of claim 1, wherein at least one of the verification sensors extracts information embedded in a magnetic stripe or a chip embedded in a payment instrument.

12. The OLED device of claim 1, further comprising at least one notch, said notch to secure the payment instrument in the predetermined space.

13. The OLED device of claim 12, wherein the notch secures a first edge of the payment instrument, and the screen is reshaped by being bent around a second edge of the payment instrument that is opposite the secured first edge of the payment instrument, said reshaping forming an axis where the screen bends along the second edge, and wherein:
    a first verification sensor captures a picture of the payment instrument; and
    a second verification sensor measures at least one dimension of the payment instrument by detecting the distance between the notch and the axis.

14. A flexible organic light emitting diode (OLED) device for positioning an article, said OLED device comprising:

a screen including an array of OLEDs;
a power source for illuminating the screen;
a processor circuit comprising a non-transitory memory and a processor; and
one or more verification sensors;
wherein:
the screen is configured to be flexible;
the screen, when flexed, defines a predetermined space in at least one dimension, said space for positioning an article relative to the verification sensors; and
the OLED device, responsive to a request from the processor circuit, captures information associated with the article that is in the predetermined space via at least one of the verification sensors;
and wherein:
the article is a card with symbols embossed thereon, and, when the article is pressed against the screen in the predetermined space, a tactile sensor that is a verification sensor captures the symbols.

15. The OLED device of claim 14, wherein the information captured by the OLED device includes:
a photo on a photo identification card;
a number associated with the article; or
a physical attribute of the article, said physical attribute including size, shape, and/or color.

16. The OLED device of claim 14, wherein the processor compares, for verification, the information captured by the OLED device to information stored in the non-transitory memory.

17. A method for positioning an article in a predetermined space for authentication, the method comprising:
bending a bendable organic light emitting diode (OLED) device, said bendable OLED device comprising:
a screen comprising an array of OLEDs;
a power source for illuminating the screen;
a processor circuit comprising a non-transitory memory and a processor; and
two or more verification sensors, a first verification sensor embedded in a section of a front surface of the OLED device, and a second verification sensor embedded in a section of a back surface of the OLED device;
positioning the article within a predetermined space formed by bending the bendable OLED device; and
detecting, via at least one of the verification sensors, the presence of and/or information associated with the article in the predetermined space;
the method further comprising:
rolling the bendable OLED device such that the section of the front surface overlaps and faces the section of the back surface, the interstitial space between the facing sections forming the predetermined space;
detecting, via the first verification sensor, one side of the article in the predetermined space; and
detecting, via the second verification sensor, another side of the article in the predetermined space.

* * * * *